US012307596B2

United States Patent
Achlioptas et al.

(10) Patent No.: US 12,307,596 B2
(45) Date of Patent: May 20, 2025

(54) 3D GARMENT GENERATION FROM 2D SCRIBBLE IMAGES

(71) Applicants: Panagiotis Achlioptas, Mountain View, CA (US); Menglei Chai, Los Angeles, CA (US); Hsin-Ying Lee, San Jose, CA (US); Kyle Olszewski, Los Angeles, CA (US); Jian Ren, Hermosa Beach, CA (US); Sergey Tulyakov, Santa Monica, CA (US)

(72) Inventors: Panagiotis Achlioptas, Mountain View, CA (US); Menglei Chai, Los Angeles, CA (US); Hsin-Ying Lee, San Jose, CA (US); Kyle Olszewski, Los Angeles, CA (US); Jian Ren, Hermosa Beach, CA (US); Sergey Tulyakov, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 194 days.

(21) Appl. No.: 17/957,049

(22) Filed: Sep. 30, 2022

(65) Prior Publication Data
US 2024/0112401 A1  Apr. 4, 2024

(51) Int. Cl.
*G06T 19/00* (2011.01)
*G06T 17/10* (2006.01)
(52) U.S. Cl.
CPC .............. *G06T 17/10* (2013.01); *G06T 19/00* (2013.01); *G06T 2210/16* (2013.01); *G06T 2210/56* (2013.01)
(58) Field of Classification Search
CPC .. G06T 19/00; G06T 2210/16; G06T 2210/56
See application file for complete search history.

(56) References Cited

U.S. PATENT DOCUMENTS

2020/0364533 A1* 11/2020 Sareen .................... G06T 19/00

OTHER PUBLICATIONS

Emmanuel Turquin et al: "Sketching garments for virtual characters", International Conference on Computer Graphics and Interactive Techniques, ACM SIGGRAPH 2006 Papers, Boston, Massachusetts, ACM, New York, NY, USA, Jul. 30, 2006.
(Continued)

*Primary Examiner* — Matthew Salvucci
(74) *Attorney, Agent, or Firm* — CM Law; Stephen J. Weed

(57) ABSTRACT

A system and method are described for generating 3D garments from two-dimensional (2D) scribble images drawn by users. The system includes a conditional 2D generator, a conditional 3D generator, and two intermediate media including dimension-coupling color-density pairs and flat point clouds that bridge the gap between dimensions. Given a scribble image, the 2D generator synthesizes dimension-coupling color-density pairs including the RGB projection and density map from the front and rear views of the scribble image. A density-aware sampling algorithm converts the 2D dimension-coupling color-density pairs into a 3D flat point cloud representation, where the depth information is ignored. The 3D generator predicts the depth information from the flat point cloud. Dynamic variations per garment due to deformations resulting from a wearer's pose as well as irregular wrinkles and folds may be bypassed by taking advantage of 2D generative models to bridge the dimension gap in a non-parametric way.

16 Claims, 19 Drawing Sheets

(56) References Cited

OTHER PUBLICATIONS

International Search Report and Written Opinion for International Application No. PCT/US2023/029082, dated Nov. 8, 2023 (Aug. 11, 2023)—11 pages.
Jiayun Wang et al: "3D Shape Reconstruction from Free-Hand Sketches", arxiv.org, Cornell University Library, 201 Olin Library Cornell University Ithaca, Ny 14853, Jan. 19, 2022.
Yao Li et al: "A deep learning based interactive sketching system for fashion images design", arxiv.org, Cornell University Library, 201 Olin Library Cornell University Ithaca, NY 14853, Oct. 9, 2020.
Zezhou Cheng et al: "Cross-Modal 3D Shape Generation and Manipulation", arxiv.org, Cornell University Library, 201 Olin Library Cornell University Ithaca, NY 14853, Jul. 24, 2022.
Achanta, Radhakrishna, et al., "Superpixels and Polygons Using Simple Non-Iterative Clustering", Proceedings of the IEEE Conference on Computer Vision and Pattern Recognition, Jul. 2017, pp. 4651-4660.
Bhatnagar, Bharat Lal, et al., "Combining Implicit Function Learning and Parametric Models for 3D Human Reconstruction", European Conference on Computer Vision, Aug. 2020.
Ho, Jonathan, et al, "Denoising Diffusion Probabilistic Models", 34th Conference on Neural Information Processing Systems, 2020.

\* cited by examiner

| # Pts | Method | EMD × 10² ↓ | CD × 10² ↓ | EMD-c × 10² ↓ | CD-c × 10² ↓ | LPIPS × 10² ↓ | ScrRecon ↓ |
|---|---|---|---|---|---|---|---|
| # 8192 | s-PointFlow | 70.31±2.65 | 18.34±0.83 | 20.81±0.91 | 6.38±0.04 | 43.79±0.11 | 46.78±0.08 |
| | s-Shape-GF | 75.74±1.67 | 18.49±0.94 | 21.06±1.12 | 7.11±0.03 | 39.98±0.08 | 44.34±0.07 |
| | img-PVD | 68.23±8.71 | 17.65±2.27 | 27.21±3.77 | 11.89±0.06 | 35.21±0.05 | 37.64±0.07 |
| | 2stage-PVD | 63.74±0.97 | 15.12±0.23 | 17.28±0.09 | 5.36±0.08 | 43.96±0.04 | 35.56±0.05 |
| | $G_s$+img-PVD | 75.74±1.67 | 16.07±0.61 | 19.45±0.08 | 4.77±0.08 | 31.21±0.04 | 33.89±0.04 |
| | c-sketch2model | 97.84±0.12 | 37.92±0.03 | 20.45±0.15 | 7.97±0.01 | 41.21±0.02 | 46.33±0.02 |
| | Disclosed Method | 59.12±0.81 | 12.71±0.11 | 14.96±0.07 | 2.82±0.02 | 27.12±0.03 | 30.32±0.04 |
| # 16384 | s-PointFlow | 132.28±6.32 | 32.79±1.91 | 28.57±1.06 | 8.84±0.11 | 43.17±0.12 | 47.22±0.11 |
| | s-Shape-GF | 116.41±5.79 | 30.31±2.17 | 25.77±1.10 | 8.31±0.11 | 38.79±0.10 | 40.88±0.09 |
| | img-PVD | 104.51±4.72 | 28.54±1.62 | 30.56±0.88 | 12.10±0.09 | 34.71±0.08 | 35.54±0.08 |
| | 2stage-PVD | 93.14±2.14 | 21.82±0.31 | 23.28±0.92 | 7.36±0.06 | 32.29±0.03 | 33.67±0.04 |
| | $G_s$+img-PVD | 91.87±3.93 | 22.18±0.26 | 24.51±0.41 | 7.83±0.07 | 30.91±0.03 | 31.45±0.03 |
| | c-sketch2model | 163.89±1.12 | 18.32±0.12 | 25.47±0.21 | 9.19±0.02 | 43.71±0.03 | 46.81±0.02 |
| | Disclosed Method | 70.09±1.61 | 13.42±0.39 | 18.22±0.55 | 2.85±0.05 | 26.27±0.03 | 28.61±0.03 |

FIG. 6

3D GARMENT GENERATION FROM 2D SCRIBBLE IMAGES

TECHNICAL FIELD

Examples set forth herein generally relate to generation of three-dimensional (3D) garments using a digital framework and, in particular, to methods and systems for generating 3D garments from two-dimensional (2D) scribble images drawn by users.

BACKGROUND

Garments are an indispensable part of human lives, affecting our culture and daily activities in myriad ways. In virtual and augmented reality applications, garments are becoming a fundamental component for various tasks relevant to digital content creation, e.g., clothed human digitization, virtual try-on, fashion design, etc. Meanwhile, garment prototyping is still a process severely hindered by the need for tedious manual labor and professional skills.

3D garment generation is particularly challenging, as garments vary not only in static shape and appearance among different categories and styles, but also in dynamic variations per garment due to deformations resulting from a wearer's pose. Furthermore, common high-frequency geometric details, such as irregular wrinkles and folds are intrinsically hard to model.

BRIEF DESCRIPTION OF THE DRAWINGS

In the drawings, which are not necessarily drawn to scale, like numerals may describe similar components in different views. Some nonlimiting examples are illustrated in the figures of the accompanying drawings in which:

FIG. 6 is a table that provides quantitative comparisons of geometry (EMD, CD), geometry and color (EMD-c, CD-c) and consistency with the input scribble (LPIPS, ScrRecon) using point-clouds containing 8K (top) and 16K (bottom) points;

DETAILED DESCRIPTION

Figure 1:
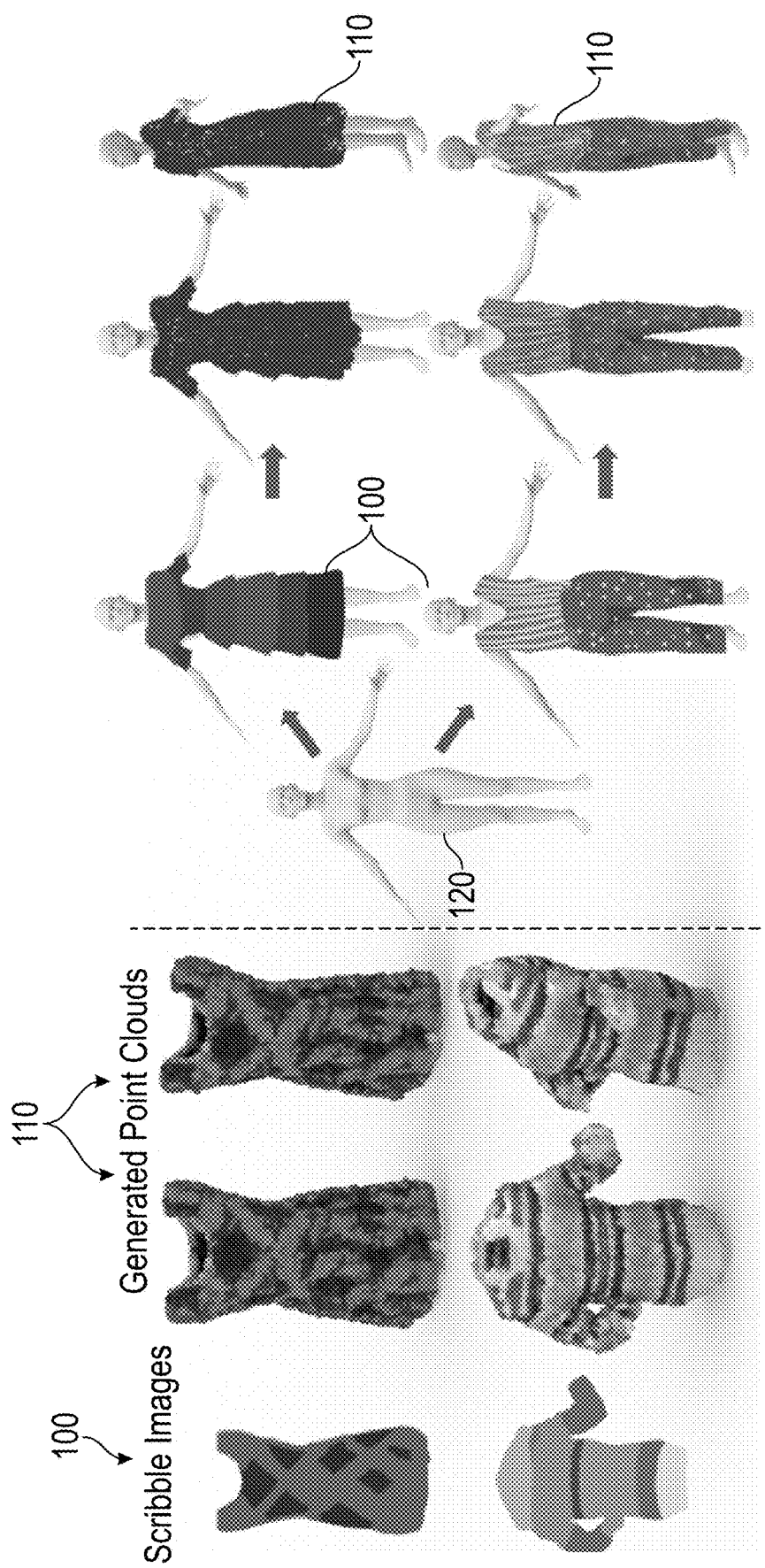
FIG. 1 is an illustration depicting the conversion of user-provided 2D scribbles into high-fidelity 3D garments where the input scribble images alone (or on a mannequin) are converted into point clouds corresponding to a 3D realization of the garment that is accessible from arbitrary views.

While there exist various types of 3D representations for garments, each benefiting a specific set of garment design and synthesis tasks, point clouds may serve as an effective representation for general garment modeling, providing desired topological flexibility and detail expressiveness. However, when it comes to 3D garment synthesis from 2D user scribbles, additional challenges arise compared to general garment generation. First, scribble—to garment generation requires domain translation from coarse and abstract 2D scribbles to detailed and realistic 3D shapes. Such domain translation is widely studied in a number of 2D image-to-image translation tasks and 3D translation works, such as point cloud completion and novel-view synthesis. However, 2D-to-3D translation problems are relatively unexplored due to the ambiguity induced by the dimensional disparity, lack of training data, and limited capability of 3D generative networks. Second, unlike the case of 2D images, for orderless representations such as 3D point clouds or meshes, the lack of a common reference frame, and therefore of highly-efficient convolutional operators, makes joint modeling of shape and color a non-trivial matter in 3D synthesis applications.

A system and method are described for addressing these and other limitations to enable the generation of 3D garments from two-dimensional (2D) scribble images drawn by users. The system includes a conditional 2D generator, a conditional 3D generator, and two intermediate media including dimension-coupling color-density pairs and flat point clouds that bridge the gap between dimensions. Given a scribble image, the 2D generator synthesizes dimension-coupling color-density pairs including the RGB projection and density map from the front and rear views of the scribble image. A density-aware sampling algorithm converts the 2D dimension-coupling color-density pairs into a 3D flat point cloud representation, where the depth information is ignored. The 3D generator predicts the depth information from the flat point cloud. Dynamic variations per garment due to deformations resulting from a wearer's pose as well as irregular wrinkles and folds may be bypassed by taking advantage of 2D generative models to bridge the dimension gap in a non-parametric way.

Designing garments is a complex process primarily performed by large fashion houses. A digital framework is desired whereby users (not just users in large fashion houses) may generate realistic 3D garments from simple colored scribbles. As described herein, a "scribble" is an abstraction of a real object that is to be reproduced and may include, for example, a 2D hand-drawn or computer-generated image prepared by a user. Those skilled in the art will appreciate that the conditional generation process from scribbles poses substantial challenges. First, 3D garment geometry is difficult to model due to its non-rigid nature and topological variability, which are further coupled with arbitrary texture and color patterns. A further challenge is to map an abstract 2D scribble into a corresponding detailed 3D realization. Moreover, in the current state of the art, there are neither efficient models available for the task, nor high-quality paired data linking the 2D scribble and the corresponding 3D realization. To address these needs, a modular pipeline framework is described herein that effectively disentangles the learning task into two intra-dimensional translation tasks in 2D and 3D. The disentanglement is enabled with two proposed intermediate media, bridged with an efficient density-aware sampling algorithm.

To generate relevant and diverse training data, a superpixel based scribble synthesis approach is described herein. To evaluate results and build ablations, sensible metrics for the problem and chosen modality are also explored. As will be apparent from the following description, the resulting framework unlocks downstream applications, such as 3D garment design, making it possible to generate high-resolution concepts from low-resolution input scribbles.

Despite the challenges of direct 2D scribble to 3D garment translation, the inventors have recognized that in-domain synthesis for both 2D and 3D subjects is much more well-explored and results in typical applications with high-fidelity results. Given this, a scribble-conditioned garment generation pipeline is described that adopts domain-specific generators for both 2D scribbles and 3D point clouds. Two strategies are implemented to bridge the domains. First, a conditional 2D generator is designed such that it returns dimension-coupling images including frontal and rear color-density pairs that can be conveniently converted to a flat point cloud using a density-aware parametric algorithm. Second, a conditional 3D diffusion-based generator is designed to lift the flat point cloud to 3D, i.e., to recover the depth dimension, which is robust and easy to train.

The present disclosure provides methods to jointly generate the shape and color of 3D garments conditioned on simple user-provided scribbles, which is achieved by a modular and highly effective pipeline for generating 3D points from 2D scribbles. In addition to domain-specific 2D and 3D generators, two novel intermediate representations are provided along with a non-parametric algorithm that bridges the gap between 2D and 3D. Sensible metrics are explored and extensive evaluations against strong baselines are provided to quantitatively show the superiority of the described methods over conventional approaches. The resulting framework is further qualitatively shown to produce results that are high-resolution, consistent with the input scribbles, and thus applicable to real-world applications such as garment design and try-on.

In sample configurations, the systems and methods described herein enable a user to generate a three-dimensional (3D) garment image from a two-dimensional (2D) garment image drawn by the user. The system includes a conditional 2D generator that receives the 2D garment image drawn by the user and translates the 2D garment image into color-density pairs, a density aware sampling algorithm that conducts density-aware sampling of the color-density pairs to generate a flat point cloud, and a conditional 3D generator that translates the flat point cloud into an output 3D point cloud for display as the 3D garment image. In the sample configurations, the 2D garment image may include a 2D hand-drawn or computer-generated abstraction of a garment defining basic color patterns and shape of a target garment. The resulting 3D garment image may be displayed on a digital representation of a user or an avatar as a virtual try-on of the 3D garment image.

A detailed description of the methodology for generating 3D garments from 2D user scribbles will now be described with reference to FIGS. 1-17. Although this description provides a detailed description of possible implementations, it should be noted that these details are intended to be exemplary and in no way delimit the scope of the inventive subject matter.

By way of example, FIG. 1 illustrates the conversion of user-provided 2D scribbles 100 into high-fidelity 3D garments where the input scribble images 100 alone (or on a mannequin 120) are converted into point clouds 110 corresponding to a 3D realization of the garment that is accessible from arbitrary views using the techniques described herein. As illustrated, the user-provided scribble images 100 may be drawn separately or on a mannequin 120 and presented as point clouds standing alone or presented on the mannequin 120.

As used herein, a "scribble" (e.g., scribble 100 in FIG. 1) typically includes a few broad strokes defining the basic color patterns and shape of a target garment, with several finer strokes containing more nuanced details. Given a scribble of a garment as an input, denoted by $I_c \in R^{H \times W \times 3}$ with H,W as its height and width, a point cloud (e.g., point cloud 110 in FIG. 1) for the target garment, denoted as $P_G \in R^{N \times (3+3)}$, with each point $p_i \in P_G$, i=1 ... N, is obtained that contains information about the garment's location and color, each point cloud containing 3 channels. The task is both cross-domain (i.e., abstract to real) and cross-dimensional (i.e., 2D to 3D). Cross-domain translation is relatively well-explored, and produces overall more impressive results than approaches to inter-dimensional generation tasks, e.g., for image-to-image translation in 2D and shape completion in 3D. However, as described below, performing domain translation across dimensions with a single model is currently challenging.

Based on the above observations, a two-stage digital framework 200 has been designed in which the generation steps are performed within domains. The digital framework 200 shown in FIG. 2A may be used to generate the images of FIG. 1 and includes a conditional 2D generator 220 and a conditional 3D generator 250, as well as two intermediate media, dimension-coupling color-density pairs 210 and flat point clouds 230, to bridge the gap between dimensions. Given a scribble image, the 2D generator 220 synthesizes dimension-coupling color-density pairs 210 including the RGB projection and density map from the front and rear views. A density-aware sampling algorithm 260 converts the 2D dimension-coupling color-density pairs 210 into a 3D flat point cloud representation 230, where the depth information is ignored. Then, a 3D generator 250 is used to predict the depth information from the flat point cloud 230. Existing 3D generation works cannot handle garments, as garments vary not only in static shape and appearance among different categories and styles, but also in dynamic variations per garment due to deformations resulting from a wearer's pose. Furthermore, common high-frequency geometric details, such as irregular wrinkles and folds are intrinsically hard to model. These difficulties are bypassed by taking advantage of 2D generative models to bridge the dimension gap in a non-parametric way.

Figure 2A:
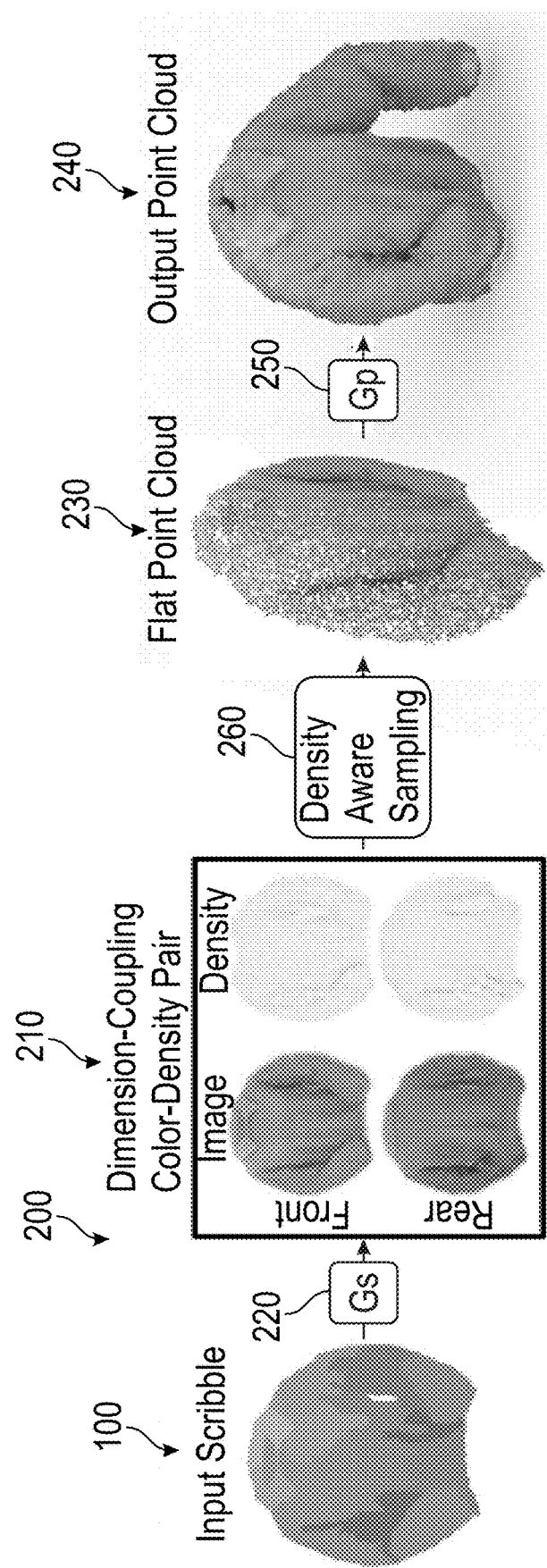
FIG. 2A is an illustration depicting a pipeline framework in a sample configuration where two intermediate media are used: flat point clouds obtained by ignoring the depth dimension, and dimension-coupling color-density pairs obtained by rasterizing and sampling real point clouds.

As shown in FIG. 2A, in the first stage, dimension-coupling color-density pairs B={{I,D}$_f$, {I,D}$_r$} 210 are generated that include the frontal {I,D}$_f$ and the rear {I,D}$_r$ color-density pairs, where $I \in R^{H \times W \times 3}$ is a color image and $D \in R^{H \times W}$ is a scalar image describing the local density at each pixel. These are generated using a conditional 2D generator $G_s$ 220 that generates the dimension-coupling color-density pairs B from the input scribble (Ic):Ic→B. To bridge the 2D and 3D domains, a parameterless density-aware sampling approach is provided that converts the color-density pairs B 210 from the first stage into a flat point cloud ($P_{flat}$) 230, in which point locations and colors are sampled from the corresponding pairs B 210. The second stage performs draping, or lifting the flat point cloud 230 to 3D (output point cloud 240) using a conditional 3D generator $G_p$ 250 that generates the 3D image $P_G$ from $P_{flat}$: $P_{flat}$→$P_G$. Both generation stages 220 and 250 may be implemented with diffusion-based generators.

In the pipeline digital framework 200 of FIG. 2A, two intermediate media are used: flat point clouds 230 obtained by ignoring the depth dimension, and dimension-coupling color-density pairs 210 obtained by rasterizing and sampling real point clouds. To bridge the cross-dimensional gap between flat point clouds 230 and dimension-coupling color-density pairs 210, a non-parametric density-aware sampling algorithm 260 is implemented. A conditional 2D generator $G_s$ 220 handles the translation from scribble images 100 to color-density pairs 210, and a conditional 3D generator $G_p$ 250 performs depth estimation from the flat point clouds 230.

Diffusion models were selected in sample configurations as the backbone of the conditional 2D generator $G_s$ 220 and the conditional 3D generator $G_p$ 250. However, diffusion models are only a design choice as diffusion models currently demonstrate superior quality in both image and point cloud generation. It will be appreciated that the pipeline digital framework 200 is agnostic to the design choice and can benefit from any future improvements in both 2D and 3D generation.

In a sample configuration, for the 2D generator $G_s$ 220, the code may be based on the Pytorch release of SR3. For the conditional context, the original images of dimension $R^{3 \times H \times W}$ were replaced with the dimension coupling color-density pairs 210 of dimension $R^{(3+3+1+1) \times H \times W}$. The images were of resolution 128. The model was trained for 1,000,000 iterations with batchsize 16. The diffusion model with 2000 time steps and with linear schedule (start, end)=($10^{-6}$, $10^{-2}$) was used.

On the other hand, for the 3D generator $G_p$ 250, the code may be based on the official release of the system described by Bhatnagar, et al. in "Combining implicit function learning and parametric models for 3D human reconstruction," European Conference on Computer Vision, 2020, the contents of which are incorporated herein by reference. Bhatnagar et al. use a point-voxel convolutional neural network (CNN) as the point cloud feature extractor. Bhatnagar et al. further combine detail-rich implicit functions with parametric modeling in order to reconstruct 3D models of people that remain controllable even in the presence of clothing. Given a sparse 3D point cloud of a dressed person, an Implicit Part Network (IPNet) is used to jointly predict the outer 3D surface of the dressed person, the inner body surface, and the semantic correspondences to a parametric body model (SMPL). The correspondences are used to fit the body model to the inner surface and then non-rigidly deform it (under a parametric body plus displacement model) to the outer surface in order to capture garment, face, and hair details. In sample configurations as described herein, in the forward (diffusion) process, noise may be added to the depth dimension. In the backward (denoising) process, the depth may be initialized with a Gaussian distribution and the depth may be updated gradually. The model is trained for 100,000 iterations with batchsize 16. The diffusion model with 1000 time steps and with linear schedule (start, end)=($10^{-4}$, $2 \times 10^{-2}$) is used.

Denoising diffusion probabilistic models (DDPM) is described by Ho, et al. in "Denoising diffusion probabilistic models," Neural Information Processing Systems, 2020, the contents of which are incorporated herein by reference. DDPM are a class of generative models that formulate the conversion from a simple distribution (e.g., a Gaussian distribution) into a target data distribution as a denoising process. To learn the denoising process, a diffusion process gradually adds noise to data. Both the diffusion (forward) and denoising (backward) processes may be modeled as Markov Chains. In both processes, each step can be modeled as a Gaussian translation. From a high-level perspective, the noisy data $x_t$ at each timestep t can be viewed as a weighted combination of original data $x_0$ and noise $\in$, in which the weight is obtained from the predefined variance sequence. The model thus aims to learn the gradual denoising from $x_{t-1}$ to $x_t$ for each timestep. With some reparameterization, the learning objective can then be further simplified as a simple mean-squared error between the real and predicted noises $|\in_\theta(x_t, t) - \in|^2$. The predicted noise $\in_\theta(x_t, t)$ then can be used to calculate the mean $\mu_\theta(x_t, t)$ in the denoising process.

The translation task is simplified when the source and target domains are intra-dimensional. The key to decoupling the translation task into two separate generation tasks in 2D and 3D is the use of two proposed intermediate media, dimension-coupling color-density pairs 210 and flat point clouds 230, and a non-parametric algorithm 260 to bridge these media. Color-density pairs B 210, as a 2D medium, aim to provide sufficient information for the following lifting process. As noted above, these color-density pairs include a frontal and a rear color-density pair. On the other hand, a flat point cloud $P_{flat}$ 230 is a reduced representation of a point cloud without depth information, or, equivalently, of constant depth.

The color-density pairs and flat point cloud facilitate a simple cross-dimensional conversion. A non-parametric algorithm, density-aware sampling 260, approximates the flat point cloud $P_{flat}$ 230 given the color density pairs B 210. In particular, given color-density pairs B 210, for each pixel location (i, j), the corresponding centered coordinate $x^{ij}$, $y^{ij}$ from the pixel coordinate (i, j) and the estimated number of points to be added $n_f^{ij}$, $n_r^{ij}$ for front (f) and rear (r) input 2D images are obtained. Then $n_f^{ij}+n_r^{ij}$ points are appended to the target flat point cloud 230 with the first two coordinates as centered coordinates perturbed by noises, the depth dimension as 0, and the color as $v_f^{ij}$ and $v_r^{ij}$. That is, $n_f^{ij}$ points are inserted with coordinates as $(N(x^{ij}, \sigma^2), N(y^{ij}, \sigma^2), 0)$ and colors as $v_f^{ij}$, and $n_r^{ij}$ points with coordinates $(N(x^{ij}, \sigma^2), N(y^{ij}, \sigma^2), 0)$ and colors as $v_r^{ij}$. The noise perturbations permit non-deterministic mapping to obtain edge points of the object.

Sample pseudocode for implementing the density aware sampling 260 is shown in Algorithm 1 below. For the hyper-parameters, the minimal and maximal number of density points sampled at each location are set as 5 and 30, respectively, standard deviation $\sigma^2$ as 0.001, and the point cloud coordinate range $x_{min}$, $x_{max}$, $y_{min}$, $y_{max}$ as −0.2, 0.25, −0.33, 0.12. The point cloud coordinate range is empirically set based on the distribution of the dataset.

Figure 2B:
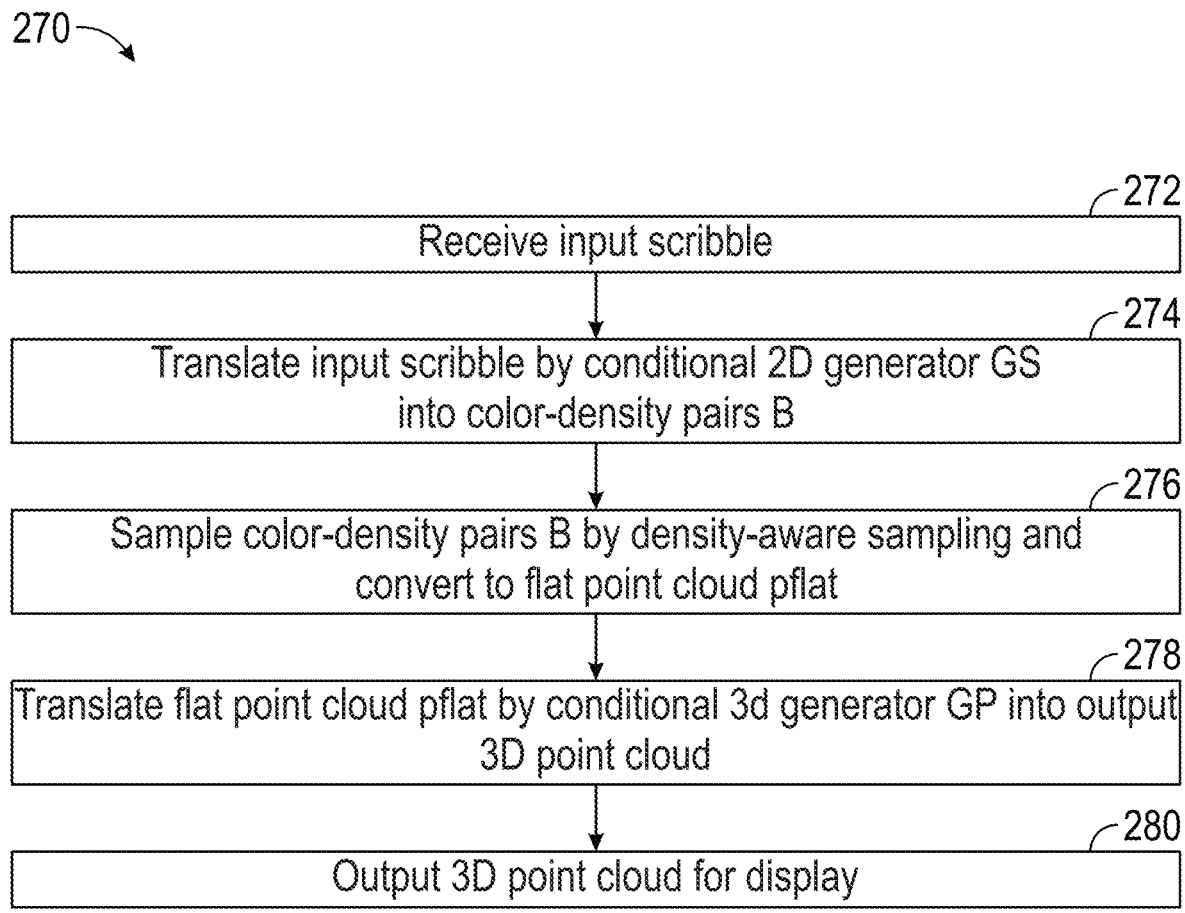
FIG. 2B is a flow chart illustrating the operational flow of the pipeline framework of FIG. 2A in a sample configuration.

FIG. 2B is a flow chart 270 illustrating the operational flow of the pipeline digital framework 200 of FIG. 2A in a sample configuration.

As illustrated, an input scribble 100 is received at 272. The input scribble 100 may be a scan of a hand-drawn image prepared by a user or a hand-drawn image drawn on a tablet or other input device. The input scribble 100 also may be a computer-generated image prepared by the user using a conventional graphics design program.

At 274, the received input scribble 100 is translated by the conditional 2D generator $G_s$ 220 into color-density pairs B 210. As noted above, given a scribble image 100, the 2D generator 220 synthesizes dimension-coupling color-density pairs B 210 including the RGB projection and density map from the front (f) and rear (r) views.

The color-density pairs B 210 are then sampled by density-aware sampling 260 at 276. For example, the density-aware sampling at 276 may be performed by an algorithm such as Algorithm 1 described above. In accordance with such an algorithm, for given color-density pairs B 210, for each pixel location (i, j), the corresponding centered coordinate $x^{ij}$, $y^{ij}$ from the pixel coordinate (i, j) and the estimated number of points to be added $n_f^{ij}$, $n_r^{ij}$ for front (f) and rear (r) input 2D images are obtained. Then $n_f^{ij}+n_r^{ij}$ points are appended to the target flat point cloud 230 with the first

---

Algorithm 1: Density Aware Sampling 260

```
Input      : Color-density pairs {(I_f , D_f), (I_r , D_r)} of image shape W × H
Parameter  : Min number of points n_min, max number of points n_max, standard deviation σ²
             point cloud coordinate range x_min, x_max, y_min, y_max
Output     : Flat Point Clouds p_flat = {(p^i_coord, p^i_color)}^N_{i=1} ∈ R^{N×(1+3+3)}
d_fmax, d_fmin = max(D_f), min(D_f); d_rmax, d_rmin = max(D_r), min(D_r);
P_f, P_r ← { }, { };
for i ← 1 to H, j ← 1 to W do
    v_f^ij , v_r^ij ← I_f(i, j), I_r(i, j); d_f^ij , d_r^ij ← D_f(i, j), D_r(i, j);
    // Get coordinates, color and number of points for pixel location i, j
            n_f^ij = n_min + (n_max − n_min) * (d_f^ij − d_fmin)/(d_fmax − d_fmin);
    n_r^ij = n_min + (n_max − n_min) * (d_r^ij − d_rmin)/(d_rmax − d_rmin);
    x^ij = i × (x_max − x_min)/H + x_min; y^ij = i × (y_max − y_min)/W + y_min;
    // For front and rear set, append points with coordinates perturbed by noise
    for n ← 1 to n_f^ij do
        p^{ijn}_coord = (x^ij + N(0, σ²), y^ij + N(0, σ²), 0) ; // depth dimension is 0
        P_f ← P_f + (p^{ijn}_coord, V_f^ij);
    end
    for n ← 1 to n_r^ij do
        p^{ijn}_coord = (x^ij + N(0, σ²), y^ij + N(0, σ²), 0);
        P_r ← P_r + (p^{ijn}_coord, v_r^ij);
    end
    P_flat = P_f + P_r;
End
```

---

3D garment generation from 2D user scribbles 100 thus includes a conditional 2D generator $G_s$ 220, a conditional 3D generator $G_p$ 250, and density-aware sampling 260 for the cross-dimensional connection, as shown in FIG. 2A. With the help of color-density pairs 210 and flat point clouds 230, the formulations of both conditional translations are straightforward. For 2D translation, color-density pairs B 210 are synthesized from a scribble image $I_c$ 100. For 3D translation, depth prediction is performed from a flat point cloud $P_{flat}$ 230. At the inference time, the density-aware sampling 260 converts the generated B 210 into an approximated $P_{flat}$ 230. Both translations can be formulated in the format of diffusion models as:

$$\text{for } G_s, p_\theta(B_{t-1}|B_t,I_c) = N(S_{t-1}|\mu_\theta(B_t,t,I_c),\sigma_t^2 I),$$

$$\text{for } G_p, p_\theta(P_{t-1}|P_t,P_{flat}) = N(P_{t-1}|\mu_\theta(P_t,t,P_{flat}),\sigma_t^2 I) \quad (1)$$

and the objective functions are $|\epsilon_\theta(S_t, t, I_C)-\epsilon|^2$ for $G_s$ and $|\epsilon_\theta(P_t, t, P_{flat})-\epsilon|^2$ for $G_p$.

two coordinates as centered coordinates perturbed by noises, the depth dimension as 0, and the color as $v_f^{ij}$ and $v_r^{ij}$. That is, $n_f^{ij}$ points are inserted with coordinates as $(N(x^{ij}, \sigma^2), N(y^{ij}, \sigma^2), 0)$ and colors as $v_f^{ij}$, and $n_r^{ij}$ points with coordinates $(N(x^{ij}, \sigma^2), N(y^{ij}, \sigma^2), 0)$ and colors as $v_r^{ij}$. The noise perturbations permit non-deterministic mapping to obtain edge points of the object. The result is a flat point cloud $P_{flat}$ 230 as described above.

At 278, the flat point cloud $P_{flat}$ 230 is translated by the conditional 3D generator $G_p$ 250 into the output 3D point cloud 240. The 3D generator may include a diffusion model that predicts the depth information from the flat point cloud. For example, the 3D generator $G_p$ 250 may use a point-voxel convolutional neural network (CNN) as the point cloud feature extractor. In the forward (diffusion) process, noise may be added to the depth dimension. In the backward (denoising) process, the depth may be initialized with a Gaussian distribution and the depth may be updated gradually.

At 280, the resulting 3D point cloud is outputted for display on a display.

EXAMPLES

Unlike classical image-to-image translation, in the described setting there exist no paired scribble images in correspondence to relevant colored point clouds. It is noted that there are multiple ways in which a garment can be sketched, depending on the granularity and complexity of the user's input. Thus, the downstream application allows the user to create 3D garments by specifying their features with broad and fine strokes, representing the global and local characteristics of a garment. In this sense, scribbles are conceptually similar to superpixels, where pixels are grouped based on their perceptual features.

Figure 3:
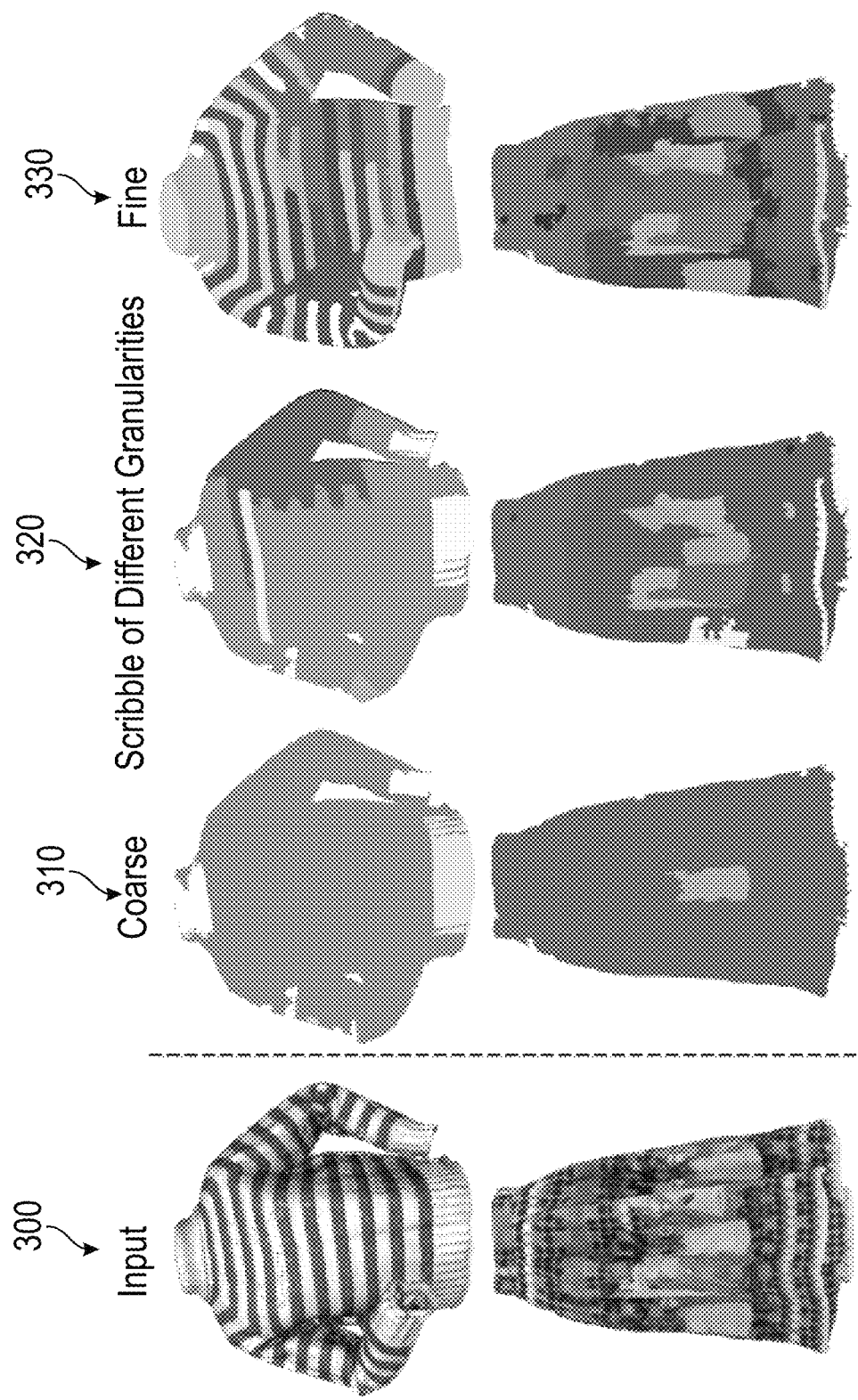
FIG. 3 is an illustration depicting samples of generated scribbles with different levels of details with different target numbers of segments for clustering.

In a sample configuration, to generate training data sets, the point clouds are first rendered to 2D images with a Pytorch3D rasterizer, and scribbles are extracted using the Simple Non-Iterative Clustering (SNIC) algorithm described by Achanta, et al. in "Superpixels and polygons using simple non-iterative clustering" IEEE Conference on Computer Vision and Pattern Recognition, 2017, the contents of which are incorporated herein by reference. The SNIC algorithm is a non-iterative version of the Simple Linear Iterative Clustering (SLIC) algorithm that implements polygonal partitioning of images using SNIC segmentation as the starting point. In sample configurations, for k-th superpixel $S_k$, the color is assigned as $C_k=1/|S_k|$ ($\Sigma_{ci \in Sk} c^i$), where $c_i$ is a color of the i-th pixel contained in $S_k$ and $|S_k|$ denotes the number of pixels in $S_k$. For each image, K={5, 10, 15, 25, 50} superpixels are extracted to simulate scribbles with different levels of detail and granularity. FIG. 3 shows samples of generated scribbles with different levels of details ranging from coarse (310), intermediate (320), and fine (330), with different target numbers of segments for clustering. The input training data sets are generated from the input point clouds 300.

Figure 4:
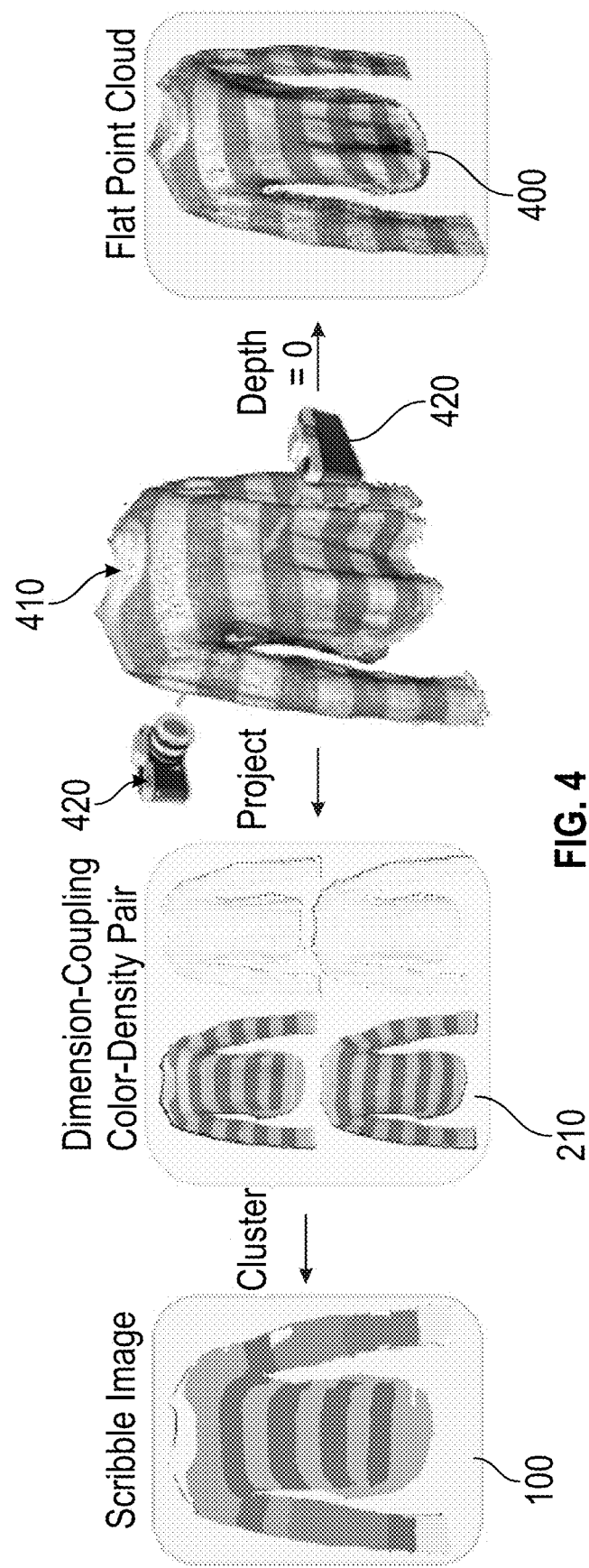
FIG. 4 is an illustration depicting the process of creating a flat point cloud from a scribble image in a sample configuration.

To generate frontal and rear color-density pairs B 210 as training data sets, point clouds are first spatially (on dimensions without depth) divided into subgroups, where center depth is measured and the point clouds are split into frontal and rear parts accordingly. To obtain the color images, the point clouds are rendered using an orthographic camera. To generate the density images, the frontal and rear point cloud are projected to a plane and their 2D histograms are computed. The resulting images have size 512 and adopt 128× 128 bins in practice. FIG. 4 illustrates the process of creating the flat point cloud from the scribble image. As illustrated, a single training example may include a scribble image 210, color-density pairs 210, and the target flat point cloud: {$I_c$, B, $P_G$} 400 generated from the input point cloud 410 generated by an orthographic camera 420.

In a sample configuration, the DeepFashion3D dataset is used as the dataset as it is the largest existing dataset for 3D garments. It provides point clouds of 2078 garments of 10 different categories, e.g., coat, trousers, dress, skirt, etc. For each garment, 5 scribbles of different granularity are generated, resulting in 10,390 inputs. The dataset is split into 90% training and 10% testing samples.

To establish baselines, three state-of-the-art point cloud generation methods and one mesh-based method are modified for experimental comparisons. To evaluate the design choices, three groups of comparisons are considered. First, single-stage methods approaches are evaluated. To do so, state-of-the-art point-cloud generation methods, such as PointFlow, Shape-GF (Shape-Gradient Fields), and point-voxel diffusion (PVD) are modified such that they take scribble images as the input and output the colored point cloud. The modified methods are denoted as s-PointFlow, s-Shape-GF and s-PVD, respectively. For s-PointFlow, the official code of PointFlow is modified to make the originally unconditional point conductive normal form (CNF) $G_\theta$ condition on the scribble images with an image encoder. For s-Shape-GF, the official code of Shape-GF is modified whereby the encoder and decoder in the variational autoencoder (VAE) are conditional on the scribble images with an image encoder. For s-PVD, the official code of PVD is modified to append the features extracted from scribble images to the features of every point for all point-voxel CNNs used in the denoising model.

Second, different implementations of two-stage approaches are evaluated. In the first approach, conditional PVD is adopted to predict shapes (i.e., coordinates only) from scribbles, followed by another conditional PVD to perform point cloud colorization again conditioned on scribbles. This approach is denoted as 2 stage-PVD. In the second approach, the 2D generator $G_s$ is adopted to generate dimension-coupling pairs, followed by PVD to generate the final colored point cloud conditioned on the output of $G_s$. This approach is denoted as $G_s$+img-PVD. Finally, the results are compared with a recent mesh-based method, sketch2model.

The approach was further modified to additionally predict the color of vertices, denoted as c-sketch2model. To perform quantitative comparisons, points on the generated meshes were uniformly sampled to form point clouds. In the c-sketch2model, the official code of the sketch2model was modified by providing the model with both gray-scale sketches (for silhouette matching) as well as colored scribbles as inputs. Then, in addition to the vertices and faces prediction, the model was asked to also predict the color of each vertex. An additional L1 loss is used on the color prediction.

There exist a number of ways to evaluate the quality of predicted geometry. Likewise, texture or color quality can be evaluated using various existing perceptual metrics. For the present task, however, color and geometry need to be evaluated jointly. To facilitate future work in conditional 3D garment synthesis, the approach may be evaluated under a number of metrics, evaluating the geometry and color, as well as scribble consistency. In such an approach, a colored point cloud P is denoted as ($P^p$, $P^c$), where $P^p \in R^{N \times 3}$ represent locations and $P^c \in R^{N \times 3}$ represent colors. The common Earth Mover's Distance (EMD) and Chamfer Distance (CD) are adopted to calculate the distances between points in two point clouds $P_1$ and $P_2$ as follows:

$$CD = \min \Sigma_{p1 \in P1} |p_1^p - \phi_1(p_1)^p|_2^2 + \min \Sigma_{p2 \in P2} |p_2^p - \phi_2(p_2)^p|_2^2, \phi_1(p_1) \in P_2, \phi_2(p_2) \in P_1$$

$$EMD = \min \Sigma_{p1 \in P1} |p_1^p - \phi(p_1)^p|_2^2, \phi : P_1 \to P_2 \text{ is a bijection} \quad (2)$$

The assignment functions φ were obtained from the distance measurement. φ was used to measure the color distance, denoted as CD-c and EMD-c as follows:

$$CD\text{-}c = \Sigma_{p1 \in P1} |p_1^c - \phi_1(p_1)^c|_2^2 + \Sigma_{p2 \in P2} |p_2^c - \phi_2(p_2)^c|_2^2,$$
$$EMD\text{-}c = \Sigma_{p1 \in P1} |p_1^c - \phi(p_1)^c|_2^2 \quad (3)$$

The Learned Perceptual Image Patch Similarity (LPIPS) metric also may be used to measure the perceptual distance between the input scribble images and the projected images of the generated colored point clouds. A Pytorch3D rasterizer may be used to project images from point clouds. All reported numbers may be averaged from 5 trials. To measure the correspondence between the generated 3D garment and the input scribbles, a scribble-garment consistency score (ScrRecon) may be introduced. The measurement may be conducted by performing the processing outlined above to obtain scribbles from the generated 3D garments and comparing them using the aforementioned perceptual distance. The measurement thus can be formulated as ScrRecon=LPIPS ($I_c$, Scribble(Rasterize(P))).

Figure 5:
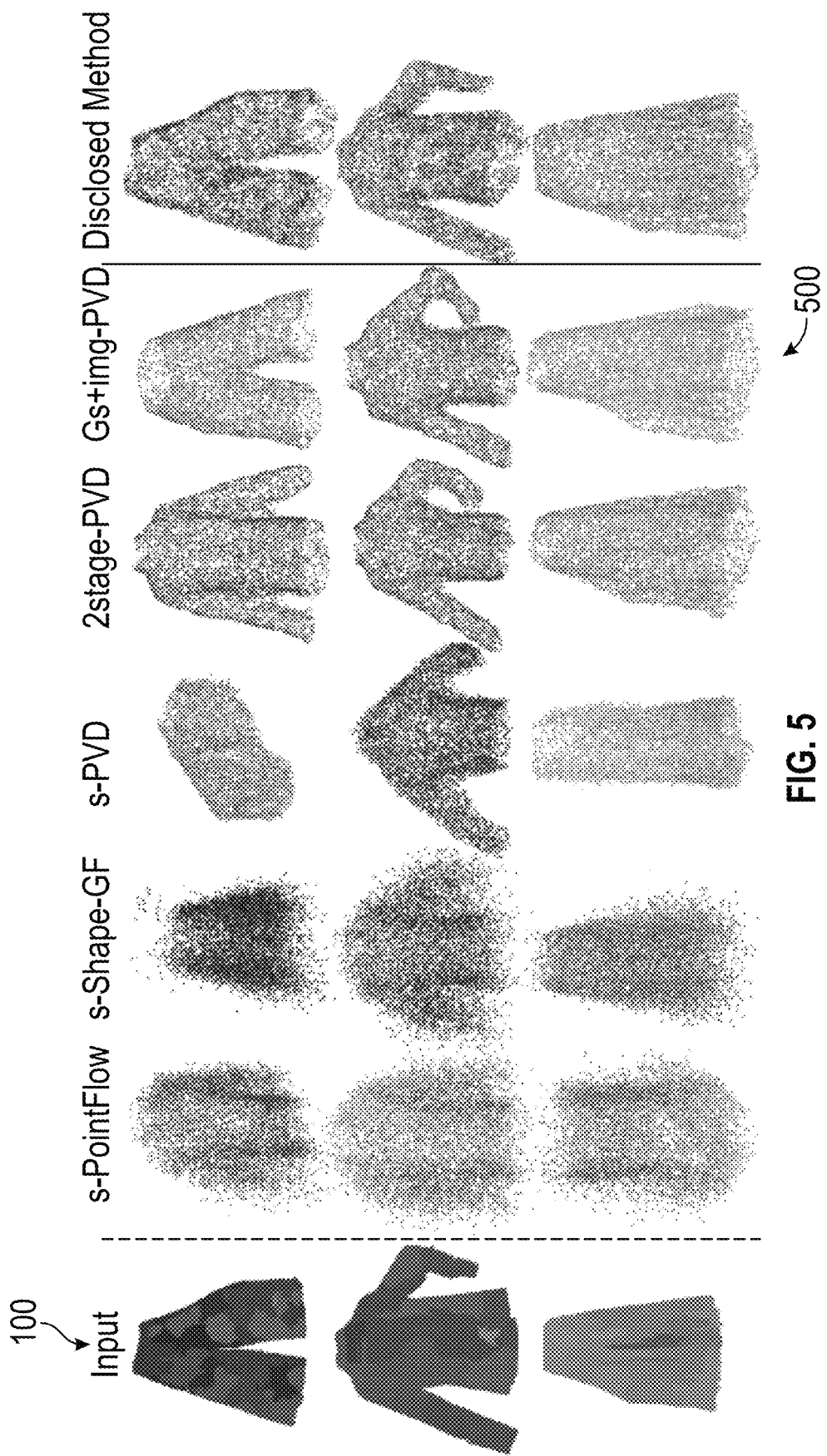
FIG. 5 is an illustration depicting input scribbles (left) that are translated into 3D garments using point-cloud-based methods in a sample configuration.

To generate the colored point cloud from scribbles, the method described with respect to FIG. 2 was compared with one-stage methods including modifications of PointFlow, Shape-GF, and PVD. FIG. 5 shows input scribbles 100 (left) that are translated into 3D garments 500 using point-cloud-based methods where the synthesized garments contain 16,384 points. The qualitative samples in FIG. 5 show that one-stage methods (s-PointFlow, S-Shape-GF, and s-PVD) fail to jointly model shape and color well. s-PointFlow and s-Shape-GF predict noisy point clouds without clear garment outlines. Furthermore, these methods can only roughly reproduce the mean color of a scribble, let alone nuanced details, as is supported by numerical scores in FIG. 6, where the methodology described herein is identified as "Neural Couture." EMD, CD, and their color counterparts (EMD-c and CD-c) are substantially worse than for the disclosed method. Though s-PVD generates sharp shapes, they are often inconsistent with the input and the color distribution is off. This is supported in FIG. 6, suggesting that handling cross-dimension and cross-domain translation simultaneously remains difficult for current 3D architectures. In particular, FIG. 6 provides quantitative comparisons of geometry (EMD, CD), geometry and color (EMD-c, CD-c) and consistency with the input scribble (LPIPS, ScrRecon) using point-clouds containing 8K (top) and 16K (bottom) points. Mean and standard deviation over 5 trials are shown.

According to qualitative and quantitative evaluations, two-stage methods (2stage-PVD and $G_s$+img-PVD) show more promising results for both shape and color modeling. Due to the decoupled shape and color stages, the 2stage-PVD method improves the generation quality. However, as the model still needs to handle the difficult cross-domain translation in 3D, it often fails to translate correctly (first row in FIG. 5). On the other hand, while still being inferior in terms of scores, the quality of the shapes of the $G_s$+img-PVD are closest to the disclosed method. However, it can only vaguely capture the color distribution in the scribble.

The results of FIG. 5 show that it is desirable to rely on 2D generators to tackle both cross-dimension and cross-domain translation tasks, at least given the capability of current 3D generators.

Figure 7A:
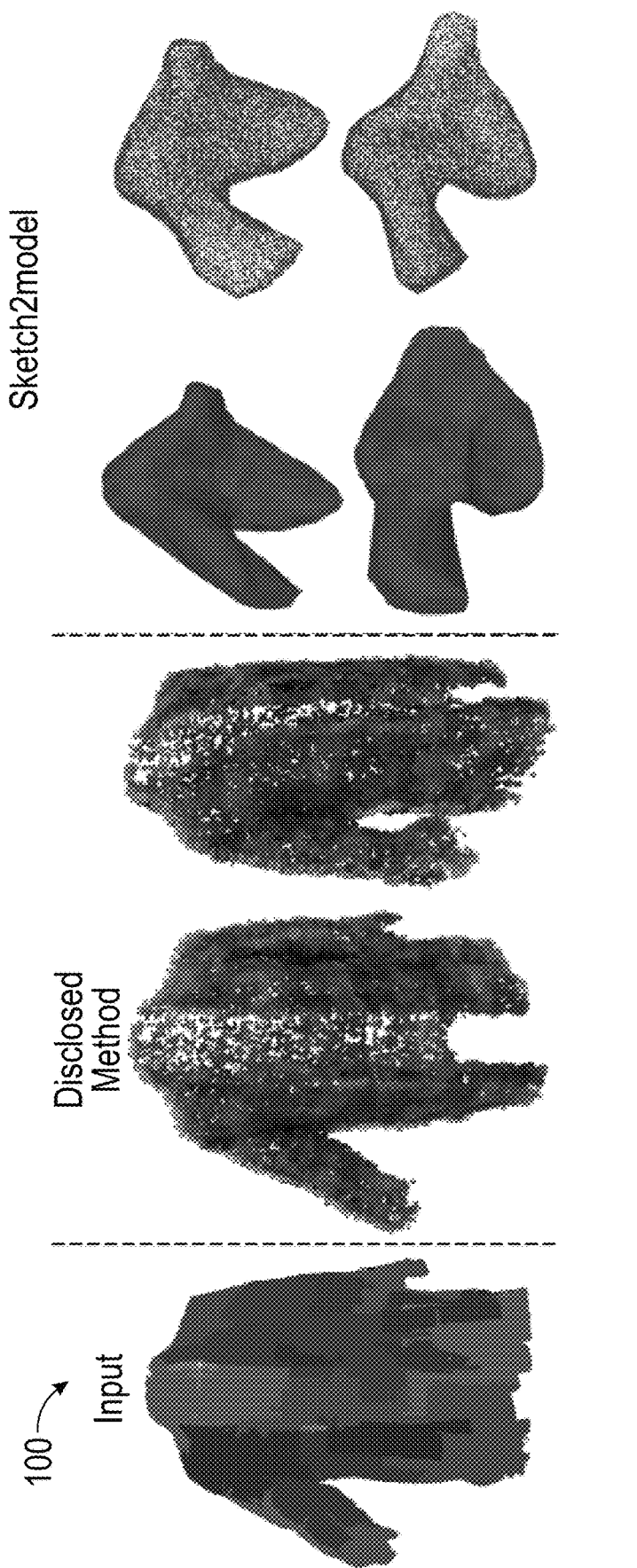
FIGS. 7A and 7B are illustrations depicting two examples where an input scribble (left) is translated into a volumetric 3D garment using the disclosed method (middle), followed by the output of a mesh-based method (right)
Figure 7B:
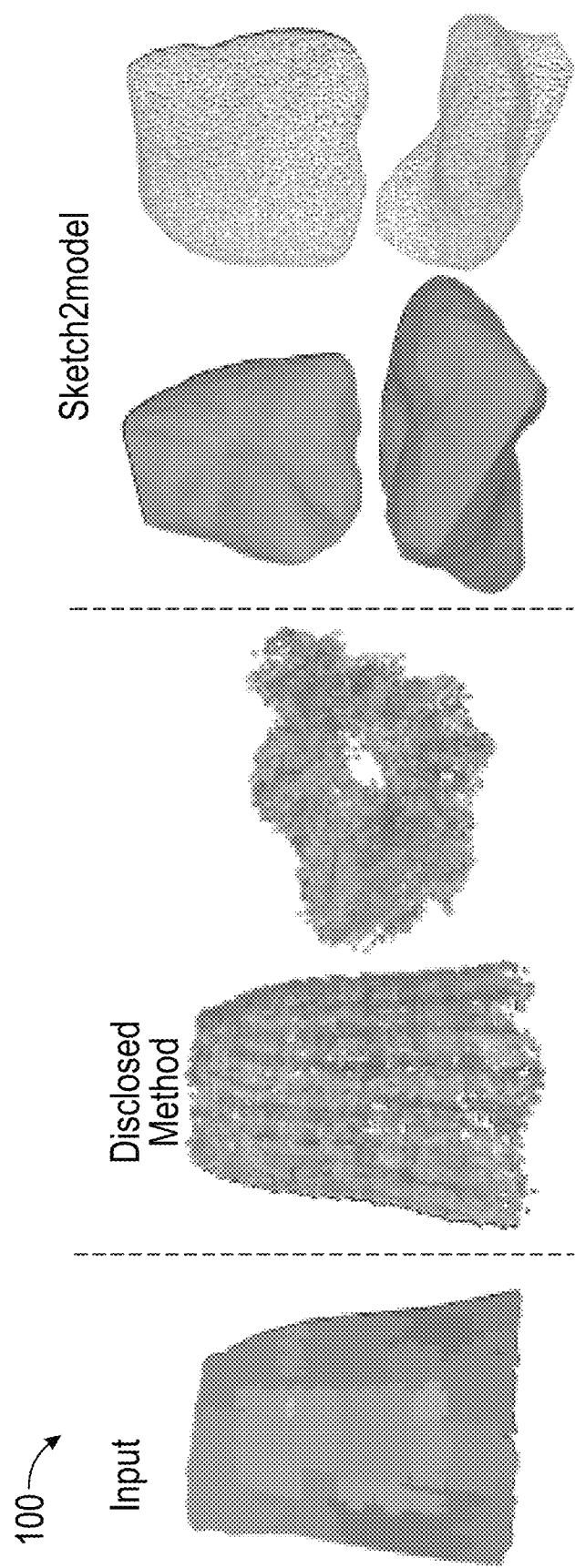

A comparison to a mesh-based method was also conducted to demonstrate the advantages of adopting point clouds as the 3D representation. Existing sketch to-mesh methods use sketches to generate meshes, showing results on samples with simple topology and limited variations (e.g., ShapeNet). Results of the described method were compared with a modified version of the shape2model method that also predicts the color of vertices. As shown in FIG. 6, FIG. 7A, and FIG. 7B, the performance of the current mesh-based method is substantially below any point-cloud-based methods. FIGS. 7A and 7B illustrate two examples. In each, an input scribble (left) 100 is translated into a volumetric 3D garment using the disclosed method (middle), followed by the output of a mesh-based method (right). It will be appreciated that, without correct 3D structure, the model can only predict uniform average color.

Figure 8:
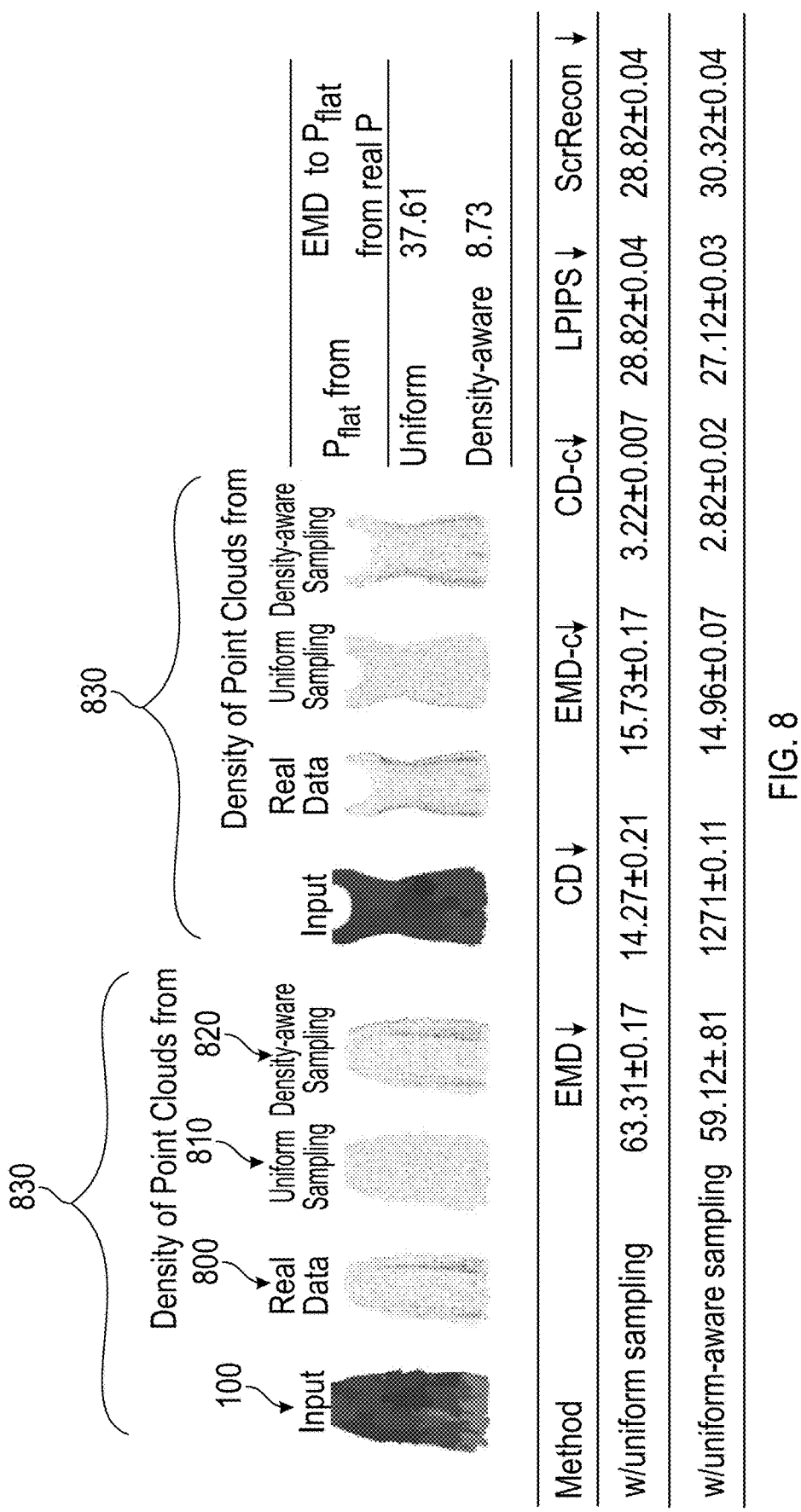
FIG. 8 is an illustration depicting an input scribble and its corresponding point cloud (real data), followed by a point cloud obtained using uniform sampling and the density-aware sampling approach in sample configurations.

The goal of density-aware sampling 260 is to align the distribution of the flat point cloud 230 sampled from real point clouds and the flat point clouds 230 sampled from the auxiliary image sets. FIG. 8 portrays the quantitative and qualitative results illustrating the impact of density-aware sampling 260. In the top left of FIG. 8 is illustrated an input scribble 100 and its corresponding point cloud (real data) 800, followed by a point cloud obtained using uniform sampling 810 and the density-aware sampling approach 820 described herein. In the top right of FIG. 8 is illustrated the distribution of the flat point clouds 830 obtained from density-aware sampling 260 that is much closer to the real distribution. At the bottom of FIG. 8 is illustrated the results without density-aware sampling, i.e., when uniform sampling is used, and that of the full model. FIG. 8 shows that the density distribution of the flat point clouds 230 sampled with the density-aware sampling 260 is very similar to the real data. It will be appreciated that with only uniform sampling, the difference between the inference and training distribution may lead to slight performance degradation.

Figure 9:
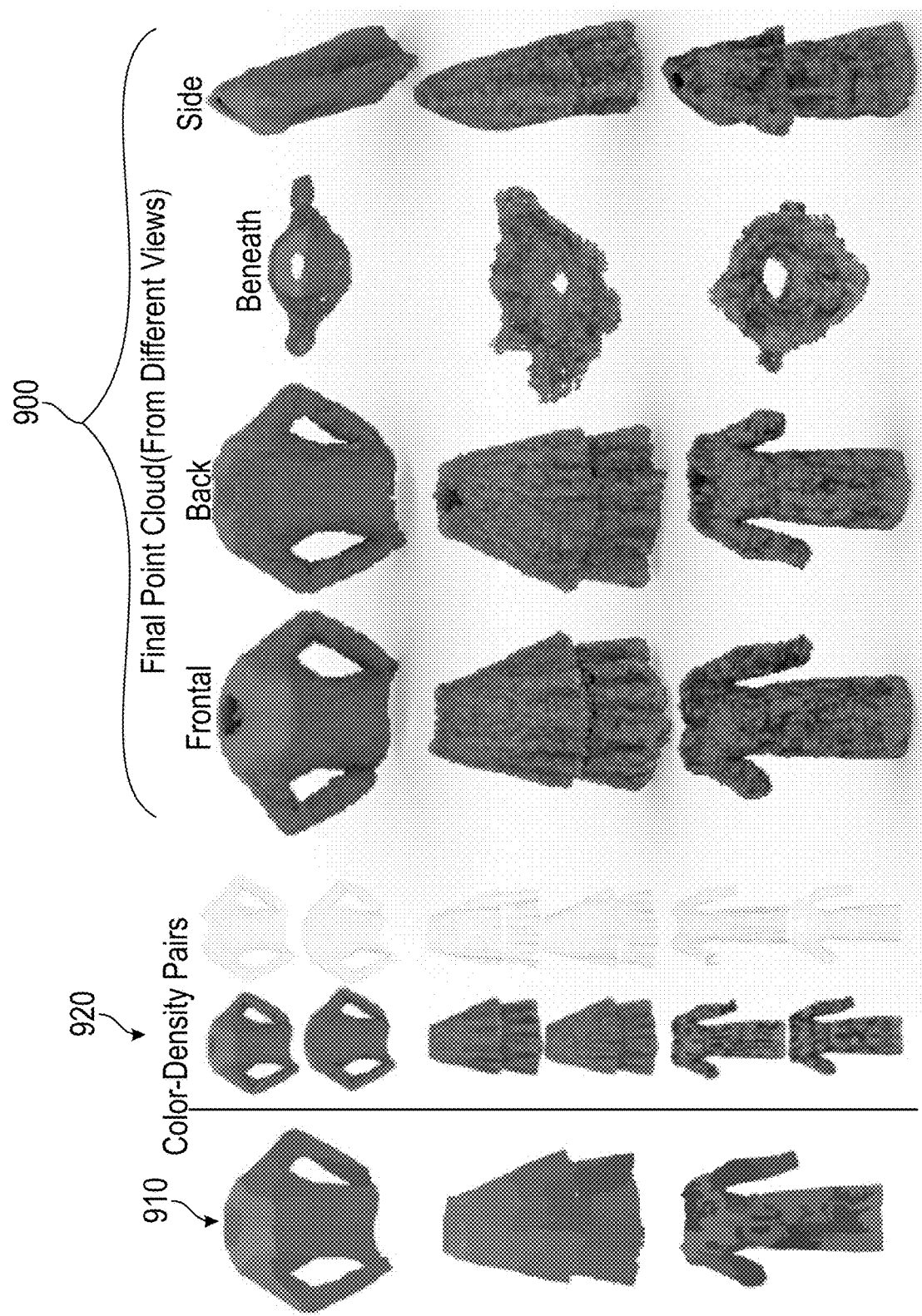
FIG. 9 is an illustration depicting multi-view renderings of diverse 3D garments containing 32,768 points, their input scribbles, and color-density pairs.

In experiments, the baseline methods were unable to synthesize high-density results (FIG. 5 shows 16K point clouds). The disclosed approach can generate garments at a much higher density containing 32,768 points, as shown in FIG. 9, which illustrates multi-view renderings 900 of diverse 3D garments containing 32,768 points, their input scribbles 910, and color-density pairs 920, produced by $G_s$. At such a resolution, the texture and color patterns, folds, and wrinkles are conveyed in much higher detail (e.g., compare FIG. 9 with FIG. 5).

Figure 10:
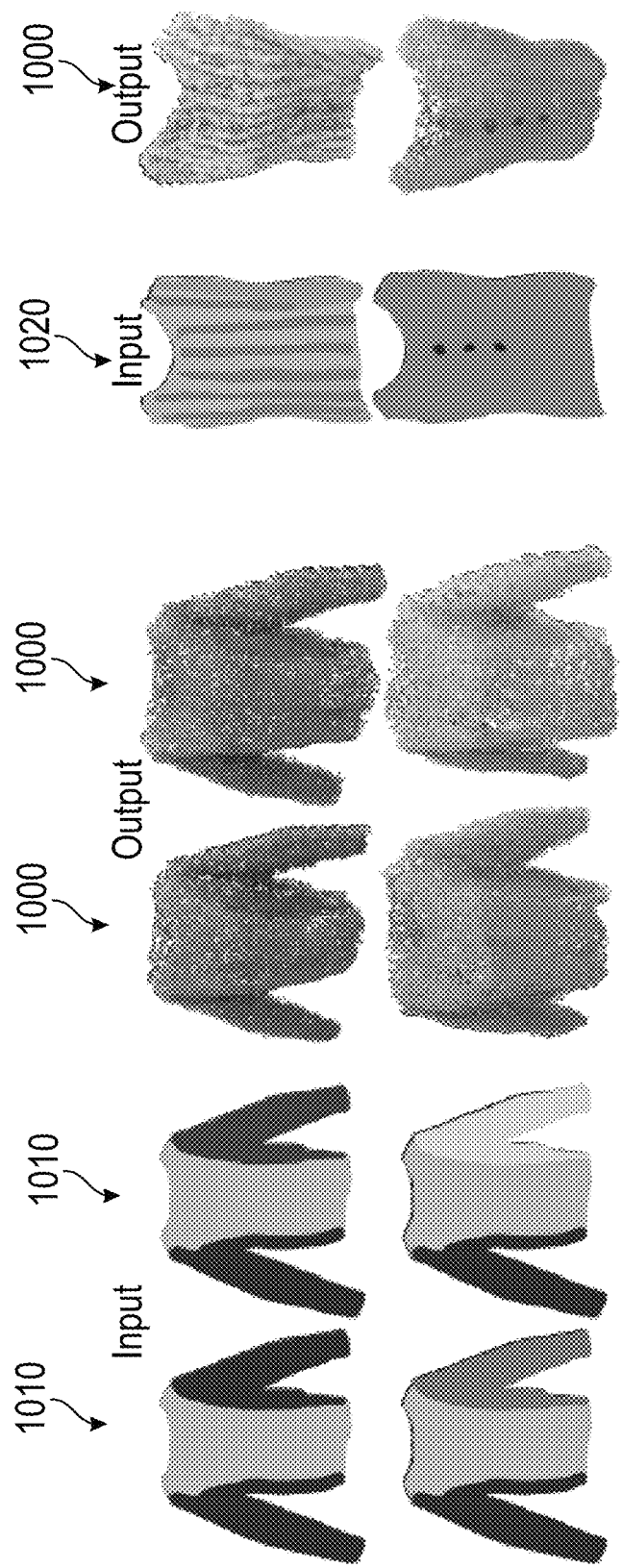
FIG. 10 is an illustration depicting results generated from custom scribble images where the generated colored point clouds are of high quality and consistent with the user input not only in terms of shape, but to the color (left) and patterns (right) designed by the users.

Those skilled in the art will appreciate that the methods described herein are readily available to some real-world applications. In FIG. 10, generated results are presented from some custom scribble images 1010 and 1020. The generated colored point clouds 1000 are of high quality and consistent with the user input not only in terms of shape, but to the color (left) and patterns (right) designed by the users. FIG. 10 also demonstrates that the model described herein is not simply memorizing and overfitting to the dataset.

Figure 11:
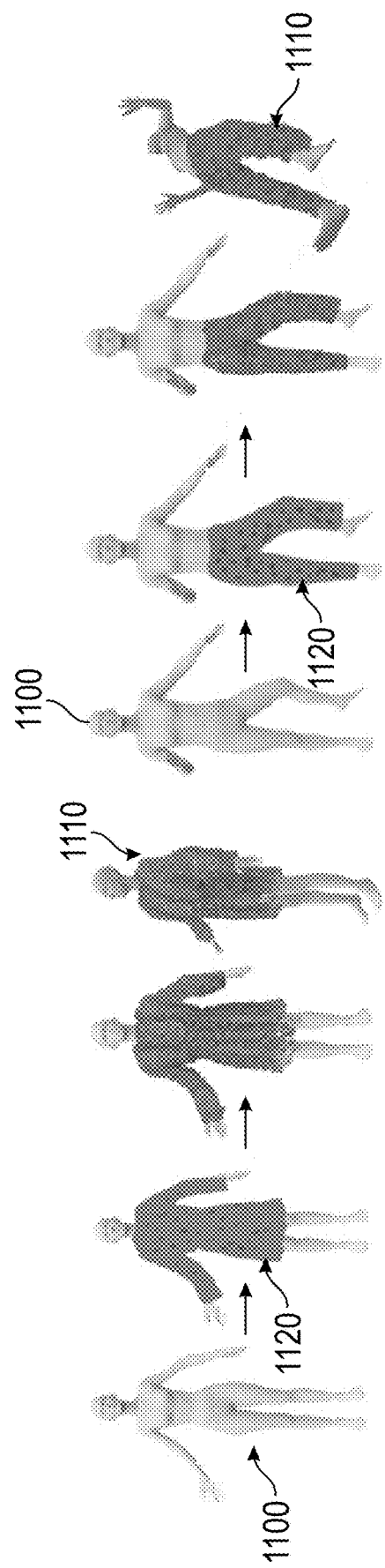
FIG. 11 is an illustration depicting an application where users draw on figures of arbitrary poses and the corresponding 3D garments are generated automatically from the scribbles.

In addition, users may simply draw on figures of arbitrary poses on a mannequin 1100, and the corresponding 3D garments 1110 may be generated automatically from the scribbles 1120, as shown in FIG. 11. It will be appreciated that such an application can potentially simplify and expedite the fashion design pipeline and unlock a user's innate creativity.

Figure 12:
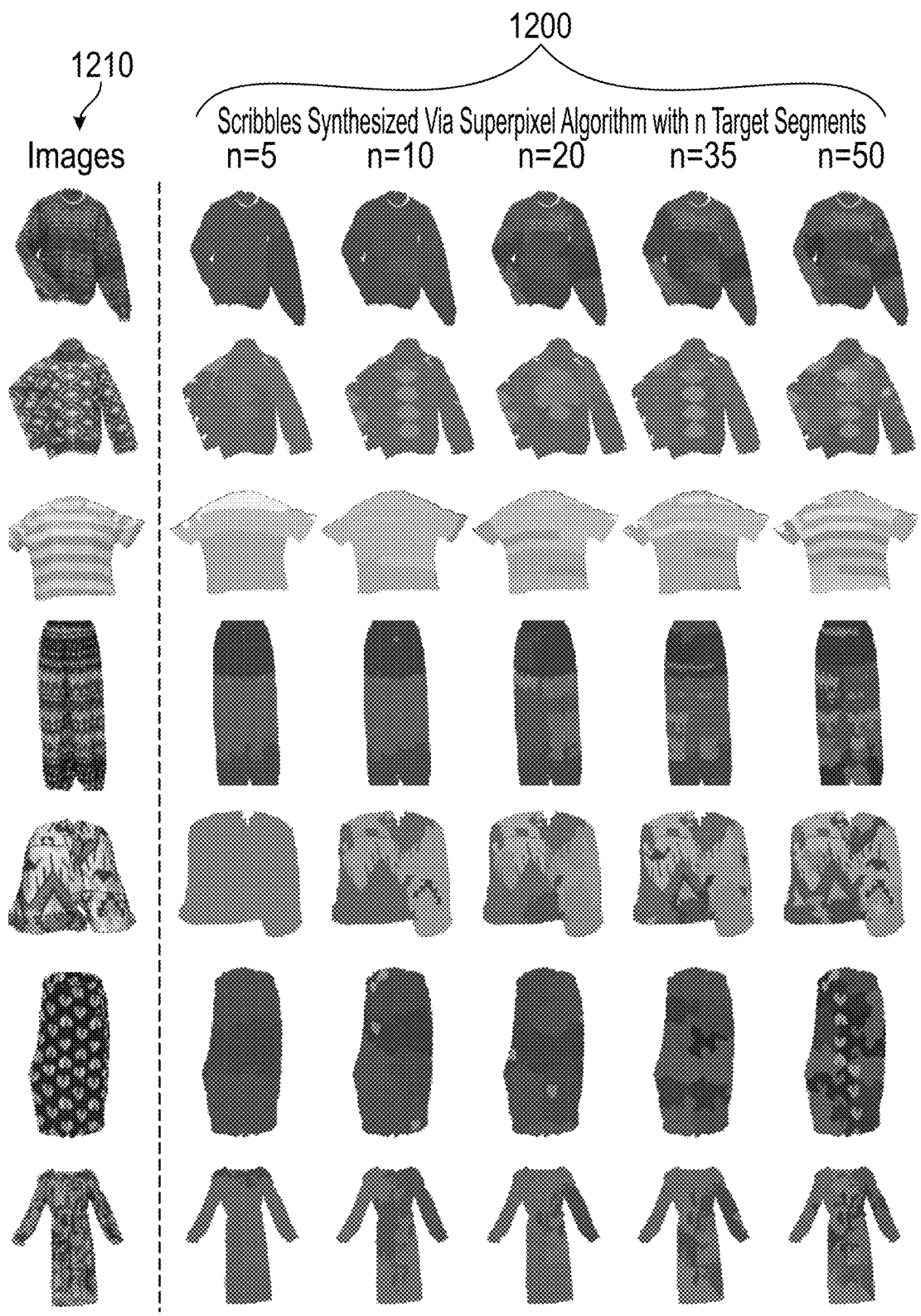
FIG. 12 is an illustration depicting synthesized samples using different numbers of target segments during processing where the data preparation pipeline simulates different levels of scribble details.

FIG. 12 illustrates more synthesized samples 1200 using different numbers of target segments during the processing. The data preparation pipeline of FIG. 2A thus can simulate different levels of scribble details from input image 1210.

Figure 13:
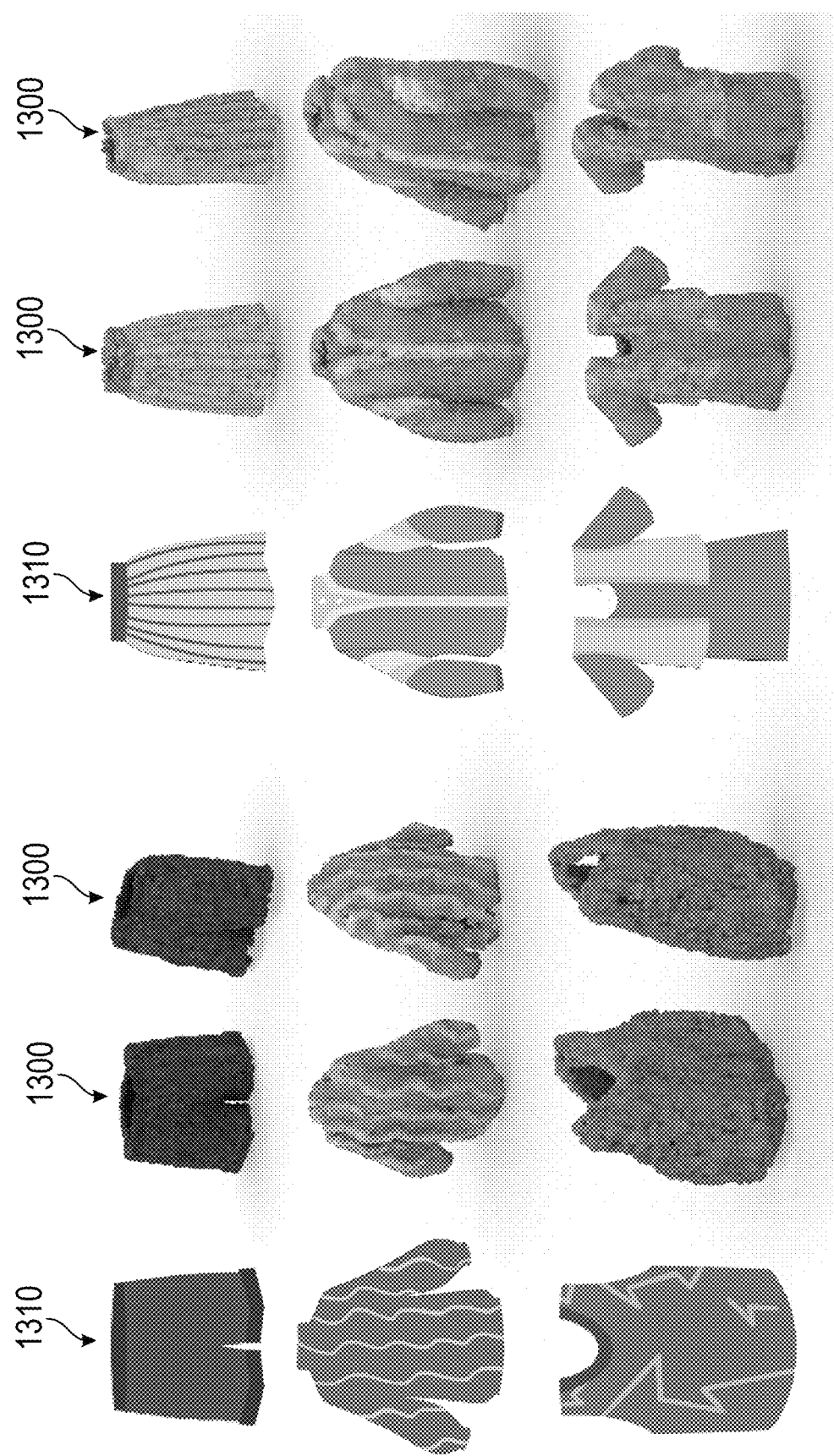
FIG. 13 is an illustration depicting samples in which a designer was asked to provide designs for garments where the model described herein generated plausible output despite a larger distribution gap between the scribbles provided by the designer and the scribbles used in training.

In order to showcase some real-world applications, a designer was asked to provide designs for garments. Despite the larger distribution gap between the scribbles provided by the designer and that used in training, the model described herein still generated plausible output 1300 from input designs 1310, as shown in FIG. 13. The model described herein was also shown to be usable in the garment designing process, where designers can stop at any moment and visualize the current design.

Figure 14A:
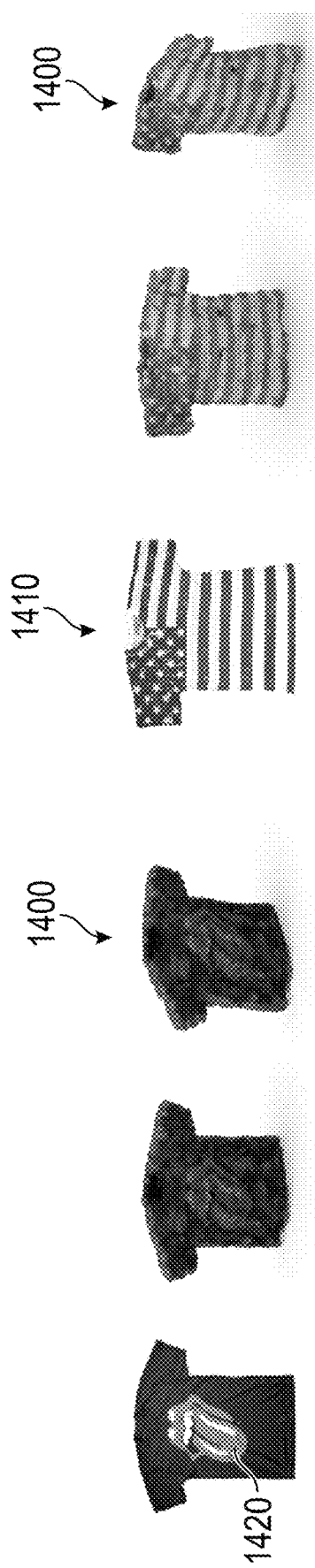
FIG. 14A is an illustration depicting the generation of 3D garments from scribbles including real commercial images.
Figure 14B:
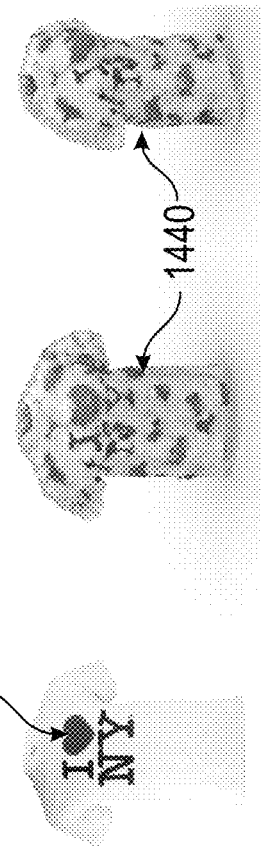
FIG. 14B is an illustration depicting a "failure case" due to a domain gap where the model views the heart shape as a scribble pattern and attempts to cover the garment with this pattern.

The model described herein was also applied to real commercial images. Despite the even larger distribution gap, the model described herein still synthesized decent results, as shown in FIG. 14A, which illustrates the generation of 3D garments 1400 from scribbles 1410 including real commercial images 1420. FIG. 14B further presents an interesting "failure case" due to the domain gap. In FIG. 14B, the model views the heart shape 1430 as a scribble pattern and attempts to cover the garment with this pattern as shown at 1440. In sample configurations, the training data may be used to train the model to not put the pattern on the back of the garment where the image is only a frontal image.

Figure 15:
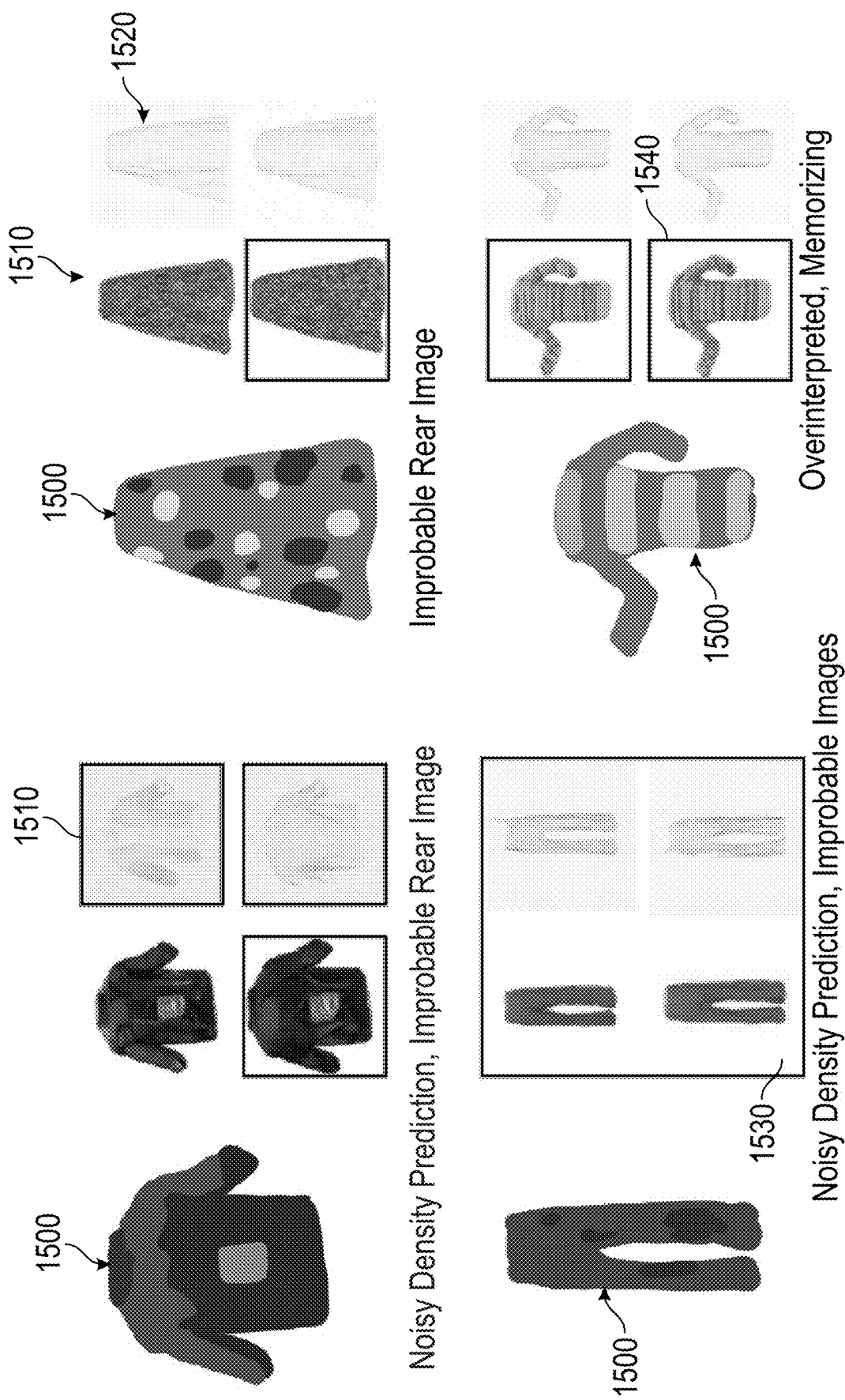
FIG. 15 is an illustration depicting some observed failure cases where the scribbles include patterns that are not learned in the training set, the scribbles fall into some distribution out of the training scope, are too far from realistic cases, or the input scribbles happen to be similar to some training data and the model over-interprets the input.

Those skilled in the art will appreciate that the limitations of the methods described herein mostly lie in the bounded generalizability of the 2D image generator. As the generator is trained on less than 2000 images, which are a relatively small set of data given the current standard of training generative models, there may be some observed failure cases, as shown in FIG. 15. First, if the scribbles 1500 include patterns that are not learned in the training set, sometimes the model may generate improbable rear images 1510 and 1520 with patterns similar to the frontal images (top-left and top-right samples). Second, if the scribbles 1500 fall into some distribution out of the training scope, or are too far from realistic cases, the predicted density maps 1510, 1530 may be noisy or even contain artifacts (top-left and bottom-left). Finally, as the training set is small, sometimes if the input scribbles 1500 happen to be similar to some training data, the model may over-interpret the input as illustrated at 1540 (bottom-right). However, these issues are orthogonal to the designed pipeline and can be solved with more training samples.

The techniques described herein thus bridge the gap between the utility of 2D representations for novice garment designers and the utility of 3D representations. To enable training such a model with appropriate paired data, a suitable way of extracting abstract but plausible "scribbles" from point clouds is provided. With the proposed intermediate media and non-parametric 2D-to-3D lifting techniques, the disclosed approach allows for highly plausible results for digitizing garments from very simple user input, despite their complicated and varying topology, non-rigid structure, and lack of accurate ground-truth data corresponding to the input. The point-based representation avoids the problems of large computational cost and memory usage at high resolutions seen with volumetric representations, while obviating the need to address issues with adapting to topological variations seen in mesh-based approaches. The described approach also enables realistic 3D renderings of the generated garments from minimal user input and is readily available for some real-world applications where the 3D garment image is displayed on a digital representation of a user or an avatar as a flexible virtual try-on of the 3D garment image generated from the user's sketches.

Figure 16:
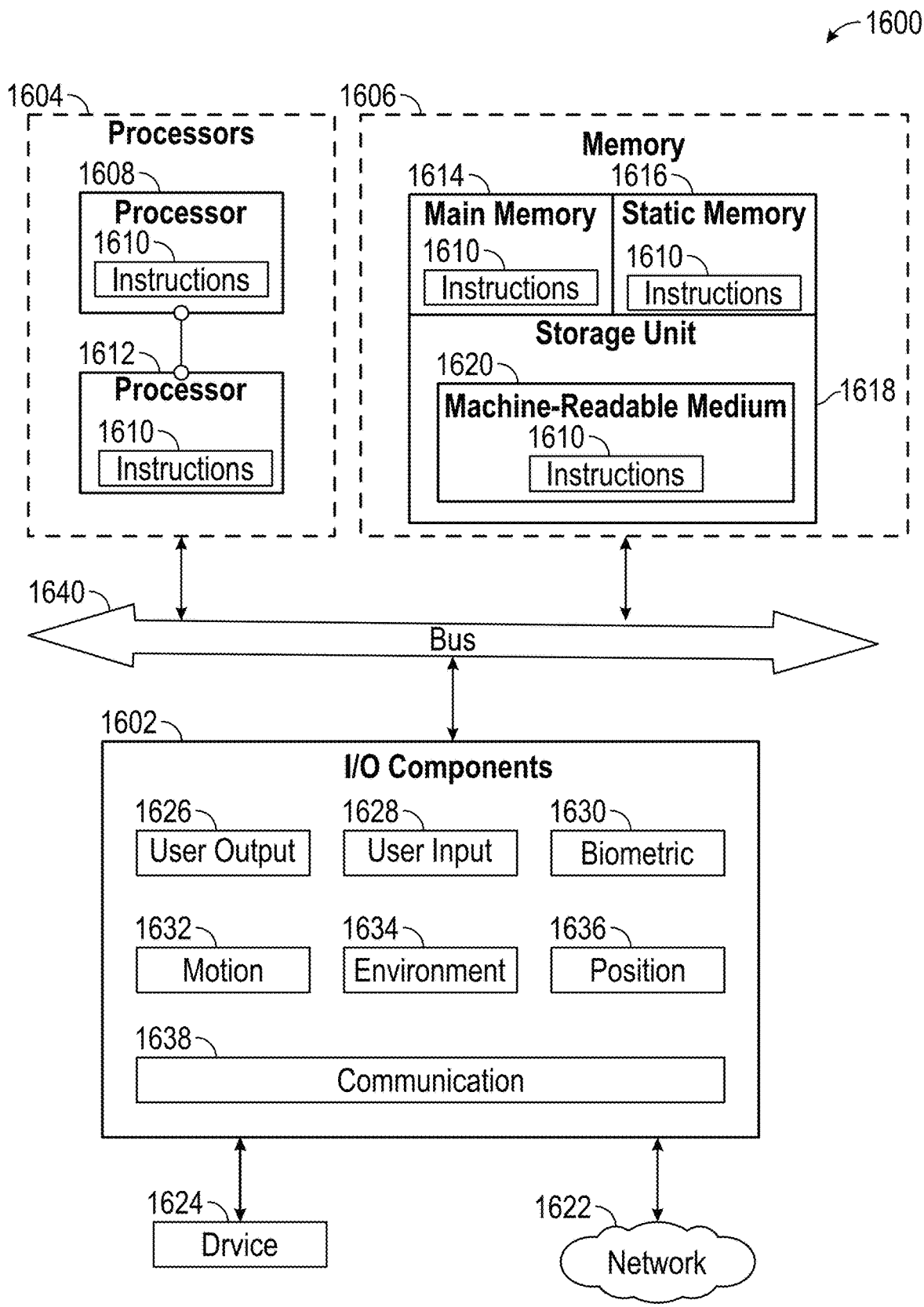
FIG. 16 is a block diagram of a machine within which instructions (e.g., software, a program, an application, an applet, an app, or other executable code) for causing the machine to perform any one or more of the methodologies discussed herein may be executed.

FIG. 16 is a diagrammatic representation of the machine 1600 within which instructions 1610 (e.g., software, a program, an application, an applet, an app, or other executable code) for causing the machine 1600 to perform any one or more of the methodologies discussed herein may be executed. For example, the instructions 1610 may cause the machine 1600 to execute any one or more of the methods described herein. The instructions 1610 transform the general, non-programmed machine 1600 into a particular machine 1600 programmed to carry out the described and illustrated functions in the manner described. The machine 1600 may operate as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1610, sequentially or otherwise, that specify actions to be taken by the machine 1600. Further, while only a single machine 1600 is illustrated, the term "machine" shall also be taken to include a collection of machines that individually or jointly execute the instructions 1610 to perform any one or more of the methodologies discussed herein. The machine 1600, for example, may comprise the encoder-decoder network of FIG. 1. In some examples, the machine 1600 may also comprise both client and server systems, with certain operations of a particular method or algorithm being performed on the server-side and with certain operations of the particular method or algorithm being performed on the client-side.

The machine 1600 may include processors 1604, memory 1606, and input/output I/O components 1602, which may be configured to communicate with each other via a bus 1640. In an example, the processors 1604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1608 and a processor 1612 that execute the instructions 1610. The term "processor" is intended to include multi-core processors that may comprise two or more independent processors (sometimes referred to as "cores") that may execute instructions contemporaneously. Although FIG. 16 shows multiple processors 1604, the machine 1600 may include a single processor with a single-core, a single processor with multiple cores (e.g., a multi-core processor), multiple processors with a single core, multiple processors with multiples cores, or any combination thereof.

The memory 1606 includes a main memory 1614, a static memory 1616, and a storage unit 1618, both accessible to the processors 1604 via the bus 1640. The main memory 1606, the static memory 1616, and storage unit 1618 store the instructions 1610 for any one or more of the methodologies or functions described herein. The instructions 1610 may also reside, completely or partially, within the main memory 1614, within the static memory 1616, within machine-readable medium 1620 within the storage unit 1618, within at least one of the processors 1604 (e.g., within the Processor's cache memory), or any suitable combination thereof, during execution thereof by the machine 1600.

The I/O components 1602 may include a wide variety of components to receive input, provide output, produce output, transmit information, exchange information, capture measurements, and so on. The specific I/O components 1602 that are included in a particular machine will depend on the type of machine. For example, portable machines such as mobile phones may include a touch input device or other such input mechanisms, while a headless server machine will likely not include such a touch input device. It will be appreciated that the I/O components 1602 may include many other components that are not shown in FIG. 16. In various examples, the I/O components 1602 may include user output components 1626 and user input components 1628. The user output components 1626 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1628 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1602 may include biometric components 1630, motion components 1632, environmental components 1634, or position components 1636, among a wide array of other components. For example, the biometric components 1630 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1632 include acceleration sensor components (e.g., accelerometer), gravitation sensor components, rotation sensor components (e.g., gyroscope).

The environmental components 1634 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

The position components 1636 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1602 further include communication components 1638 operable to couple the machine 1600 to a network 1622 or devices 1624 via respective coupling or connections. For example, the communication components 1638 may include a network interface Component or another suitable device to interface with the network 1622. In further examples, the communication components 1638 may include wired communication components, wireless communication components, cellular communication components, Near Field Communication (NFC) components, Bluetooth© components (e.g., Bluetooth© Low Energy), Wi-Fi© components, and other communication components to provide communication via other modalities. The devices 1624 may be another machine or any of a wide variety of peripheral devices (e.g., a peripheral device coupled via a USB).

Moreover, the communication components 1638 may detect identifiers or include components operable to detect identifiers. For example, the communication components 1638 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1638, such as location via Internet Protocol (IP) geolocation, location via Wi-Fi® signal triangulation, location via detecting an NFC beacon signal that may indicate a particular location, and so forth.

The various memories (e.g., main memory 1614, static memory 1616, and memory of the processors 1604) and storage unit 1618 may store one or more sets of instructions and data structures (e.g., software) embodying or used by any one or more of the methodologies or functions described herein. These instructions (e.g., the instructions 1610), when executed by processors 1604, cause various operations to implement the disclosed examples.

The instructions 1610 may be transmitted or received over the network 1622, using a transmission medium, via a network interface device (e.g., a network interface component included in the communication components 1638) and using any one of several well-known transfer protocols (e.g., hypertext transfer protocol (HTTP)). Similarly, the instructions 1610 may be transmitted or received using a transmission medium via a coupling (e.g., a peer-to-peer coupling) to the devices 1624.

Figure 17:
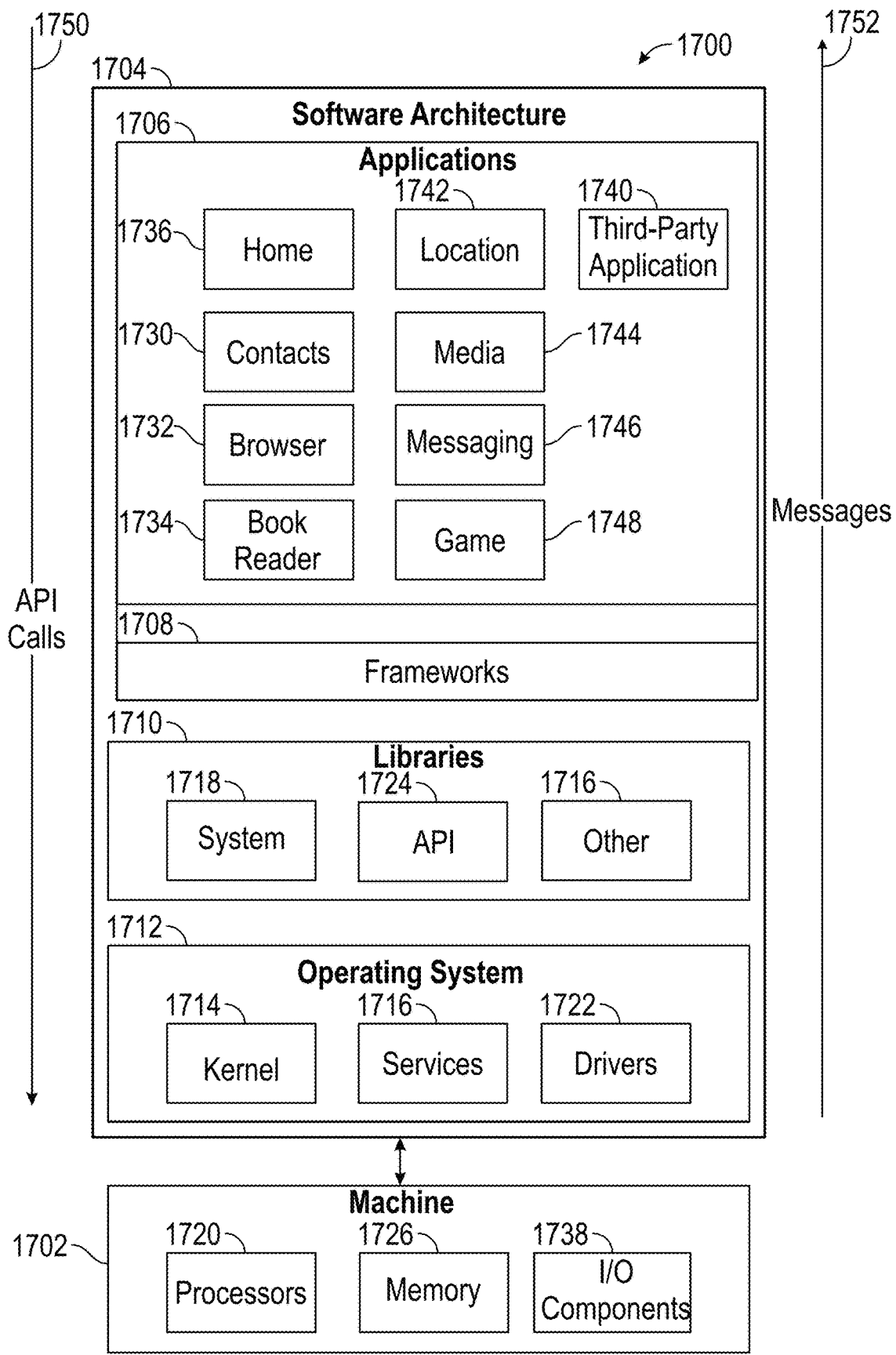
FIG. 17 is a block diagram showing a software architecture within which examples described herein may be implemented.

FIG. 17 is a block diagram 1700 illustrating a software architecture 1704, which can be installed on any one or more of the devices described herein. The software architecture 1704 is supported by hardware such as a machine 1702 (see FIG. 16) that includes processors 1720, memory 1726, and I/O components 1738. In this example, the software architecture 1704 can be conceptualized as a stack of layers, where each layer provides a particular functionality. The software architecture 1704 includes layers such as an operating system 1712, libraries 1710, frameworks 1708, and applications 1706. Operationally, the applications 1706 invoke API calls 1750 through the software stack and receive messages 1752 in response to the API calls 1750.

The operating system 1712 manages hardware resources and provides common services. The operating system 1712 includes, for example, a kernel 1714, services 1716, and drivers 1722. The kernel 1714 acts as an abstraction layer between the hardware and the other software layers. For example, the kernel 1714 provides memory management, processor management (e.g., scheduling), component management, networking, and security settings, among other functionality. The services 1716 can provide other common services for the other software layers. The drivers 1722 are responsible for controlling or interfacing with the underlying hardware. For instance, the drivers 1722 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1710 provide a common low-level infrastructure used by the applications 1706. The libraries 1710 can include system libraries 1718 (e.g., C standard library) that provide functions such as memory allocation functions, string manipulation functions, mathematic functions, and the like. In addition, the libraries 1710 can include API libraries 1724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1710 can also include a wide variety of other libraries 1716 to provide many other APIs to the applications 1706.

The frameworks 1708 provide a common high-level infrastructure that is used by the applications 1706. For example, the frameworks 1708 provide various graphical user interface (GUI) functions, high-level resource management, and high-level location services. The frameworks 1708 can provide a broad spectrum of other APIs that can be used by the applications 1706, some of which may be specific to a particular operating system or platform.

In an example, the applications 1706 may include a home application 1736, a contacts application 1730, a browser application 1732, a book reader application 1734, a location application 1742, a media application 1744, a messaging application 1746, a game application 1748, and a broad assortment of other applications such as a third-party application 1740. The applications 1706 are programs that execute functions defined in the programs. Various programming languages can be employed to generate one or more of the applications 1706, structured in a variety of manners, such as object-oriented programming languages (e.g., Objective-C, Java, or C++) or procedural programming languages (e.g., C or assembly language). In a specific example, the third-party application 1740 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1740 can invoke the API calls 1750 provided by the operating system 1712 to facilitate functionality described herein.

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method of generating a three-dimensional (3D) garment image from a two-dimensional (2D) garment image drawn by a user, the method comprising:
   receiving the 2D garment image drawn by the user;
   translating, by a conditional 2D generator, the 2D garment image into color-density pairs comprising a red, green, blue (RGB) projection and a density map of a local density at each pixel generated from front and rear views of the 2D garment image;
   conducting, by a density-aware sampling algorithm, density-aware sampling of point locations and colors of corresponding pairs of the color-density pairs to generate a flat point cloud;
   translating, by a conditional 3D generator, the flat point cloud into an output 3D point cloud; and
   sending the output 3D point cloud for display as the 3D garment image.

2. The method of claim 1, wherein the received 2D garment image comprises a 2D hand-drawn or computer-generated abstraction of a garment defining basic color patterns and shape of a target garment.

3. The method of claim 2, wherein the received 2D garment image $I_c$ is denoted by $I_c \in R^{H \times W \times 3}$ with H, W as its height and width, and the output 3D point cloud for the target garment $P_G$ is denoted as $P_G \in R^{N \times (3+3)}$, with each point $p_i \in P_G$, i=1 . . . N containing information about the target garment's location and color, where each 3D point cloud contains 3 channels.

4. The method of claim 1, further comprising drawing the received 2D garment image by the user on a mannequin and displaying the 3D garment image on the mannequin.

5. The method of claim 1, wherein conducting the density-aware sampling comprises ignoring depth during generation of the flat point cloud.

6. The method of claim 1, conducting the density-aware sampling comprises using a non-parametric algorithm that approximates the flat point cloud $P_{flat}$ given color-density pairs B for each pixel location (i, j), by obtaining for each pixel location (i, j), a corresponding centered coordinate $x^{ij}$, $y^{ij}$ from the pixel coordinate (i, j) and an estimated number of points to be added $n_f^{ij}$, $n_r^{ij}$ for front (f) and rear (r) 2D garment images, appending $n_f^{ij} + n_r^{ij}$ points to a target flat point cloud with the first two coordinates as centered coordinates perturbed by noises, a depth dimension as 0, and color as $v_f^{ij}$ and $v_r^{ij}$ whereby $n_f^{ij}$ points are inserted with coordinates $(N(x^{ij}, \sigma^2), N(y^{ij}, \sigma^2), 0)$ and colors $v_r^{ij}$, and $n_r^{ij}$ points are inserted with coordinates $(N(x^{ij}, \sigma^2), N(y^{ij}, \sigma^2), 0)$ and colors $v_r^{ij}$ where $\sigma^2$ comprises a standard deviation.

7. The method of claim 1, wherein the conditional 3D generator comprises a diffusion-based generator and translating the flat point cloud into the output 3D point cloud comprises adding noise to a depth dimension in a forward diffusion process and initializing depth with a Gaussian distribution and updating the depth gradually in a backward denoising process, where the forward diffusion process and backward denoising processes are modeled as Markov Chains and each step in each process is modeled as a Gaussian translation.

8. The method of claim 1, wherein displaying the output 3D point cloud as the 3D garment image comprises displaying the 3D garment image on a digital representation of a user or an avatar as a virtual try-on of the 3D garment image.

9. A system that generates a three-dimensional (3D) garment image from a two-dimensional (2D) garment image drawn by a user, comprising:
a conditional 2D generator that receives the 2D garment image drawn by the user and translates the 2D garment image into color-density pairs comprising a red, green, blue (RGB) projection and a density map of a local density at each pixel generated from front and rear views of the 2D garment image;
a density aware sampling algorithm that conducts density-aware sampling of point locations and colors of corresponding pairs of the color-density pairs to generate a flat point cloud; and
a conditional 3D generator that translates the flat point cloud into an output 3D point cloud for display as the 3D garment image.

10. The system of claim 9, wherein the 2D garment image comprises a 2D hand-drawn or computer-generated abstraction of a garment defining basic color patterns and shape of a target garment.

11. The system of claim 10, wherein the received 2D garment image $I_c$ is denoted by $I_c \in R^{H \times W \times 3}$ with H, W as its height and width, and the output 3D point cloud for the target garment $P_G$ is denoted as $P_G \in R^{N \times (3+3)}$, with each point $p_i \in P_G$, i=1 . . . N containing information about the target garment's location and color, where each 3D point cloud contains 3 channels.

12. The system of claim 9, wherein the density-aware sampling algorithm ignores depth during generation of the flat point cloud.

13. The system of claim 9, wherein the density-aware sampling algorithm comprises a non-parametric algorithm that approximates the flat point cloud $P_{flat}$ given color-density pairs B for each pixel location (i, j) by obtaining for each pixel location (i, j) a corresponding centered coordinate $x^{ij}$, $y^{ij}$ from the pixel coordinate (i, j) and an estimated number of points to be added $n_f^{ij}$, $n_r^{ij}$ for front (f) and rear (r) 2D garment images, appending $n_f^{ij} + n_r^{ij}$ points to a target flat point cloud with the first two coordinates as centered coordinates perturbed by noises, a depth dimension as 0, and color as $v_f^{ij}$ and $v_r^{ij}$ whereby $n_f^{ij}$ points are inserted with coordinates $(N(x^{ij}, \sigma^2), N(y^{ij}, \sigma^2), 0)$ and colors $v_F^{ij}$, and $n_R^{ij}$ points are inserted with coordinates $(N(x_{ij}, \sigma^2), N(y_{ij}, \sigma^2), 0)$ and colors $v_r^{ij}$ where $\sigma^2$ comprises a standard deviation.

14. The system of claim 9, wherein the conditional 3D generator comprises a diffusion-based generator that translates the flat point cloud into the output 3D point cloud by adding noise to a depth dimension in a forward diffusion process and initializing depth with a Gaussian distribution and updating the depth gradually in a backward denoising process, where the forward diffusion process and backward denoising processes are modeled as Markov Chains and each step in each process is modeled as a Gaussian translation.

15. The system of claim 9, further comprising a display that displays the output 3D point cloud as the 3D garment image on a digital representation of a user or an avatar as a virtual try-on of the 3D garment image.

16. A non-transitory computer-readable storage medium, the computer-readable storage medium including instructions that when executed by a processor cause the processor to generate a three-dimensional (3D) garment image from a two-dimensional (2D) garment image drawn by a user by performing operations comprising:
receiving the 2D garment image drawn by the user;
translating, by a conditional 2D generator, the 2D garment image into color-density pairs comprising a red, green, blue (RGB) projection and a density map of a local density at each pixel generated from front and rear views of the 2D garment image;
conducting, by a density-aware sampling algorithm, density-aware sampling of point locations and colors of corresponding pairs of the color-density pairs to generate a flat point cloud;
translating, by a conditional 3D generator, the flat point cloud into an output 3D point cloud; and
sending the output 3D point cloud for display as the 3D garment image.

\* \* \* \* \*